(12) United States Patent
Guida

(10) Patent No.: US 10,279,865 B2
(45) Date of Patent: May 7, 2019

(54) FRICTION DRIVE WITH SPEED WHEEL AND AUTOMATIC TRACTION CONTROL

(71) Applicant: ShareRoller LLC, New York, NY (US)

(72) Inventor: Jeffrey E. Guida, New York, NY (US)

(73) Assignee: ShareRoller LLC., New York, NY (US)

( * ) Notice: Subject to any disclaimer, the term of this patent is extended or adjusted under 35 U.S.C. 154(b) by 0 days.

(21) Appl. No.: 15/814,119

(22) Filed: Nov. 15, 2017

(65) Prior Publication Data

US 2018/0072381 A1 Mar. 15, 2018

Related U.S. Application Data

(63) Continuation-in-part of application No. 15/231,731, filed on Aug. 8, 2016.

(51) Int. Cl.
*B60L 9/00* (2006.01)
*B60L 11/00* (2006.01)
(Continued)

(52) U.S. Cl.
CPC ............... *B62M 6/75* (2013.01); *B62J 11/00* (2013.01); *B62M 6/45* (2013.01); *F16B 2/065* (2013.01);
(Continued)

(58) Field of Classification Search
CPC ........... B60L 2240/421; B60L 2240/12; B60L 15/20; B60L 2240/465; B60Y 2200/12;
(Continued)

(56) References Cited

U.S. PATENT DOCUMENTS

| 1,373,918 A | * | 4/1921 | Smith | ............... B62M 7/14 |
| | | | | 180/11 |
| 3,762,670 A | * | 10/1973 | Chillson | ............... B64C 25/36 |
| | | | | 180/301 |

(Continued)

FOREIGN PATENT DOCUMENTS

| GB | 2314820 A | * | 1/1998 | ............... B62M 6/75 |
| JP | 07017454 A | * | 1/1995 | |

*Primary Examiner* — Khoi H Tran
*Assistant Examiner* — Jorge O Peche
(74) *Attorney, Agent, or Firm* — Aaron Perez-Daple

(57) ABSTRACT

Embodiments of a friction drive system include a battery, a drive motor, a control unit, and a speed wheel. When the friction drive system is mounted on a wheeled vehicle, the speed wheel provides an accurate measurement of the vehicle speed by maintaining contact with a tire of the vehicle. An automatic traction control system, which may be part of the control unit, compares the speed of the speed wheel with the speed of the drive motor to determine whether slippage is occurring. If slippage is detected, then embodiments of an automatic traction control system automatically increase an amount of normal force between a contact surface on the drive motor and the tire, by advancing a position of the drive motor relative to a fixed mounting point. If no slippage is detected, then embodiments of an automatic traction control system automatically reduce the amount of normal force, by retracting a position of the drive relative to a fixed mounting point. In embodiments of a friction drive system, the relative position of the drive motor may be controlled by powering a worm gear motor attached to a worm gear in response to commands from the control unit.

8 Claims, 17 Drawing Sheets

(51) Int. Cl.
*B62M 6/75* (2010.01)
*B62M 6/45* (2010.01)
*B62J 11/00* (2006.01)
*F16B 2/06* (2006.01)
*F16H 13/10* (2006.01)
*B62M 6/90* (2010.01)
*B62M 7/08* (2006.01)
*B62M 7/10* (2006.01)

(52) U.S. Cl.
CPC ............... *B62M 6/90* (2013.01); *B62M 7/08* (2013.01); *B62M 7/10* (2013.01); *F16H 13/10* (2013.01)

(58) Field of Classification Search
CPC ......... B60Y 2200/91; F16H 2061/0422; F16H 2200/0034; F16H 13/10; B62M 6/45; B62M 6/75; B62M 6/90; B62M 6/40; B62M 6/50; B62M 6/55; B62M 6/60
See application file for complete search history.

(56) References Cited

U.S. PATENT DOCUMENTS

| | | | | |
|---|---|---|---|---|
| 3,841,428 A | * | 10/1974 | Bialek | B62M 13/04 180/65.1 |
| 3,921,745 A | * | 11/1975 | McCulloch | B60L 7/12 180/206.1 |
| 3,939,931 A | * | 2/1976 | Benz | A61G 5/047 180/13 |
| 4,081,048 A | * | 3/1978 | Hendricks | B62M 13/02 180/206.3 |
| 4,143,730 A | * | 3/1979 | Desmond | B62M 6/60 180/206.8 |
| 4,167,984 A | * | 9/1979 | Hottes | B62M 6/10 180/221 |
| 4,227,589 A | * | 10/1980 | Chika | B62K 13/06 180/205.7 |
| 4,418,784 A | * | 12/1983 | Fox | F02B 75/34 180/221 |
| 5,078,227 A | * | 1/1992 | Becker | A61G 5/045 180/220 |
| 5,491,390 A | * | 2/1996 | McGreen | B62M 6/45 180/221 |
| 5,842,535 A | * | 12/1998 | Dennis | B62D 63/04 180/206.8 |
| 6,065,557 A | * | 5/2000 | von Keyserling | B62M 6/75 180/221 |
| 6,497,299 B1 | * | 12/2002 | Sinclair | B62M 13/04 180/206.8 |
| 7,441,621 B2 | * | 10/2008 | Motte Dit Falisse | B62M 13/04 180/206.8 |
| 2001/0022244 A1 | * | 9/2001 | Takada | A61G 5/047 180/65.26 |
| 2003/0168273 A1 | * | 9/2003 | Ducharme | B62K 3/002 180/181 |
| 2005/0016785 A1 | * | 1/2005 | Young | B62M 6/60 180/206.5 |
| 2005/0067207 A1 | * | 3/2005 | Radtke | B62M 6/45 180/223 |
| 2008/0147281 A1 | * | 6/2008 | Ishii | B62D 51/005 701/49 |
| 2010/0001488 A1 | * | 1/2010 | Kerschgens Long | B62M 6/60 280/230 |
| 2011/0168471 A1 | * | 7/2011 | Duignan | B62M 6/35 180/205.7 |
| 2011/0232985 A1 | * | 9/2011 | Lee | B62M 6/45 180/297 |
| 2011/0284303 A1 | * | 11/2011 | Shwartz | B62M 6/70 180/220 |
| 2011/0308872 A1 | * | 12/2011 | Bright | B62M 6/75 180/206.8 |
| 2012/0065021 A1 | * | 3/2012 | Cakirogullari | B62M 13/04 476/70 |
| 2012/0312618 A1 | * | 12/2012 | Chan | B62M 6/55 180/206.4 |
| 2013/0049549 A1 | * | 2/2013 | Folmli | B62M 6/65 310/67 A |
| 2013/0138281 A1 | * | 5/2013 | Chien | B62M 6/50 701/22 |
| 2014/0166385 A1 | * | 6/2014 | Arimune | B62M 6/45 180/206.3 |
| 2014/0245852 A1 | * | 9/2014 | Lang | B62M 6/75 74/421 A |
| 2015/0008059 A1 | * | 1/2015 | Douglas | B62K 25/32 180/206.1 |
| 2016/0121963 A1 | * | 5/2016 | Tanaka | B60L 7/10 701/22 |
| 2016/0257374 A1 | * | 9/2016 | Guida | B62M 6/75 |
| 2016/0347408 A1 | * | 12/2016 | Guida | B62M 6/75 |
| 2017/0291661 A1 | * | 10/2017 | Lee | B62M 6/40 |
| 2017/0313384 A1 | * | 11/2017 | Kimmich | B62M 11/145 |
| 2017/0370785 A1 | * | 12/2017 | Jenn | G01L 1/2206 |

\* cited by examiner

FRICTION DRIVE WITH SPEED WHEEL AND AUTOMATIC TRACTION CONTROL

CROSS-REFERENCE TO RELATED APPLICATIONS

This application is a continuation-in-part of U.S. patent application Ser. No. 15/237,731, filed on Aug. 8, 2016, which claims the benefit of Provisional Patent Application No. 62/243,661, filed on Oct. 19, 2015. These applications are hereby incorporated by reference in their entirety.

FIELD OF INVENTION

The invention(s) disclosed herein relate to the field of friction drive systems, including friction drive systems that are capable of powering wheeled vehicles such as bicycles, scooters, wheelchairs, skateboards, strollers, wagons, tricycles, and other human powered vehicles. The inventions disclosed herein also may also be used with other devices, such as motorcycles, remote control vehicles, robots, wind turbines, manufacturing systems, conveyor belts, railcars, trains, printers, toys and consumer devices, among others.

BACKGROUND

Friction drive systems for powering wheeled vehicles, such as bicycles, have existed for many years. These systems deliver power through direct contact with the wheel or tire of the vehicle. Typically, a motor is mounted in a fixed position adjacent to one of the wheels. The motor can then either drive the wheel through a secondary roller mechanism pressed against the tire or directly via tire contact with the rotating outer shell of an outrunner-type motor.

A contact surface on the rotating mechanism of the friction drive presses against the tire, thereby delivering mechanical power to the wheel. Friction between the contact surface and the tire keeps the tire from slipping (relative to the contact surface) and allows power to be transferred from the motor to the wheel. The force of friction equals the normal force (of the contact surface against the tire) times the coefficient of friction, which may be expressed as follows:

$$F_f = \mu F_N$$

where $F_f$ is the force of friction, $\mu$ is the coefficient of friction, and $F_N$ is the normal force between the contact surface and the tire. The coefficient of friction is subject to change based on conditions like the weather. For example, when it rains and the tire becomes wet, the coefficient of friction typically drops significantly, reducing the force of friction for a given normal force. As another example, the coefficient of friction may be reduced if the tire becomes dusty or muddy.

When the coefficient of friction is suddenly reduced—for example, when the tire becomes wet after going through a puddle—slippage can occur between the tire and the contact surface. Such slippage can be dangerous, because it can result in sudden and unpredictable changes to the power delivered to the wheel. For example, after slipping, the tire may suddenly reengage (or "catch") with the contact surface, causing a sudden increase in the power delivered to the wheel and in the resulting speed of the vehicle. As another example, slippage could suddenly remove power from the wheel at a critical time, such as when trying to power away from an approaching vehicle or obstacle.

Known friction drive systems have difficulty responding to rapid changes in the amount of friction caused by weather (e.g., rain or snow), road conditions (e.g., dust or dirt), and other factors (e.g., loss of air in the tire). Some known systems use contact surfaces, such as sandpaper, having a high coefficient of friction to reduce slippage during changing conditions. However, such high-friction surfaces dramatically increase tire wear. Moreover, the sandpaper (or other high-friction surface) needs to be regularly replaced as it wears down, which is a tedious and time consuming process that requires regular monitoring by the consumer.

Another way to protect a friction drive system against changes in friction (e.g., due to changing road conditions) is to adjust the normal force between the contact surface and the tire. For example, a friction drive system could be configured to always provide a large normal force between the contact surface and the tire. However, continuously maintaining a large normal force requires more power due to tire churning, which drains the battery, and also increases tire wear.

In most known systems, the position of the contact surface relative to the tire is fixed when the friction drive system is installed. This fixed position, in turn, determines the normal force. In other systems, the normal force is set by a spring mechanism, gravity, or other biasing force. Still other systems provide a limited ability to adjust the normal force by manually reconfiguring the system, for example, by pulling a lever or turning a screw; however, such systems are difficult to control and typically require the user to stop the vehicle and dismount in order to change the settings.

None of these known friction drive systems provide a simple mechanism for adjusting the normal force. None of these known friction drive systems adjust the normal force dynamically in response to changing road conditions, weather, and the like. None of these known friction drive systems provide automatic traction control between the friction drive and the tire (or wheel). None of these known systems optimize the normal force to provide sufficient friction force to avoid slippage while minimizing tire wear and maximizing battery efficiency.

Another problem with known friction drive systems is that they do not automatically disengage from the tire (or wheel) when the motor is no longer in use. Engaging with the tire (or wheel) when the motor is not actively providing power causes drag on the system, reduces efficiency, and slows the vehicle. Some known systems permit the user to manually disengage the motor by means of a lever or similar mechanism, which moves the contact surface away from the tire. However, such systems are inefficient because the user frequently forgets to disengage the contact surface or is unable to disengage (and reengage) the contact surface with optimal timing. Such known systems can also be dangerous; if the user reengages the contact surface when it is spinning at a high-differential speed compared to the tire, the power delivered to the tire (and the resulting speed of the vehicle) may change suddenly and unpredictably.

Other known systems use gravity or a spring mechanism to push the contact surface away from the tire when the drive motor is unpowered (powering the drive motor creates torque that pulls the drive motor into the tire). A problem with these known systems is that they can disengage at undesirable moments, for example, due to momentary lapses in power or physical jolts from bumpy roads. Another problem with these systems is that they cannot stay engaged with the tire when the direction of force of the drive motor is reversed, for example, to provide regenerative braking.

Accordingly, there is a need in the art for friction drive systems and methods that can better adjust to changes in friction caused by road conditions, weather, and the like. There is a need in the art for an automatic traction control system for a friction drive that avoids slippage while minimizing tire wear and maximizing battery efficiency.

There also is a need in the art for systems and methods of automatically disengaging and reengaging the contact surface of a friction drive with the tire (or wheel) of a wheeled vehicle in a safe and efficient manner. In particular, there is a need in the art for friction drive systems and methods that minimize the differential between the relative speeds of the contact surface (of the motor and/or roller) and the surface of the tire (or wheel) to avoid sudden changes in speed during engagement. And there also is a need for friction drive systems and methods that can accurately determine when slippage is occurring and automatically make appropriate adjustments (e.g., by increasing the normal force and/or changing the power to the motor) to maintain power in a smooth manner without causing sudden changes in vehicle speed. A challenge for automatic friction drive systems, such as those previously disclosed by the inventor in U.S. patent application Ser. No. 15/237,731, is to accurately measure the speed of the tire (or wheel) being powered to determine when slippage is occurring and how much power should be delivered to the drive motor (and/or optimum speed of the drive motor), thereby avoiding sudden changes in vehicle speed and maximizing efficiency of the system.

SUMMARY OF THE DISCLOSURE

The present disclosure relates to improved friction drive systems, control methods for friction drive systems, and automatic traction control for friction drive systems. Embodiments of a friction drive system include a speed wheel for accurately measuring the speed of a tire of a wheeled vehicle. By comparing the speed of the speed wheel to the speed of the drive motor (or contact surface), a control unit may reliably determine whether slippage is occurring. The control unit may send commands to adjust an amount of normal force between a contact surface on the drive motor and the tire in order to prevent slippage and maximize overall system efficiency, including by extending vehicle range and battery life. Moreover, the speed of the drive motor may be controlled in a way that minimizes any abrupt changes in vehicle speed when engaging the drive motor with the tire. Embodiments of a friction drive system disclosed herein can automatically adjust to changing conditions—for example, road, weather, or tire—in a safe and efficient manner.

Embodiments of a friction drive system include a control unit with a computer processor and memory, a drive assembly with a drive motor and speed wheel, and a battery that provides power to the drive motor in response to commands from the control unit. Embodiments of a friction drive system may include an adjustment mechanism for adjusting the position of the drive motor relative to a mounting point. In embodiments of a friction drive system, the drive assembly may include a pivot mechanism, and the pivot mechanism may include a worm gear coupled to a pivot bracket with worm wheel teeth. The control unit may control the position of the worm gear relative to the pivot bracket by sending commands to a worm gear motor that powers the worm gear. The position of the worm gear relative to the pivot bracket may determine an amount of normal force applied by a contact surface disposed on the drive motor. Commands sent by the control unit to the worm gear motor may determine an amount of power provided to the worm gear motor. The amount of power provided to the worm gear motor may be determined, at least n part, by information in a feedback signal from the drive assembly to the control unit. The information in the feedback signal may include an angular speed of the speed wheel and an angular speed of the drive motor. The control unit may determine whether to provide power to the worm gear motor by comparing a ratio of the angular speed of the drive motor to the angular speed of the speed wheel with a threshold value. The worm gear motor may adjust the position of the worm gear relative to the pivot bracket if the ratio differs from the threshold value by a predetermined amount.

Embodiments of a method for controlling a friction drive system mounted on a wheeled vehicle include monitoring for a throttle signal, engaging a drive motor of the friction drive system with a tire of the wheeled vehicle, if the throttle signal is above a first threshold value, determining a target power for the drive motor using information in the throttle signal, and adjusting an amount of power provided from a battery to the drive motor until the drive motor reaches the target power. After the friction drive system is powered-on, the drive motor position may be moved to a position of full retraction. Furthermore, after the friction drive system receives a command to power-off, the drive motor position may be moved to a position of full retraction. The method may further include measuring a first speed of a speed wheel disposed on the friction drive system, measuring a second speed of the drive motor, and increasing an amount of normal force between a contact surface of the drive motor and the tire if a comparison of the first speed to the second speed indicates that slippage is occurring.

Embodiments of a method for controlling a friction drive system with a drive motor and a speed wheel include measuring a first speed of the drive motor and a second speed of the speed wheel, comparing the first speed to the second speed, and advancing a position of the drive motor relative to a mounting point, if the comparison indicates that first speed exceeds the second speed by a predetermined amount. The method may include retracting the position of the drive motor relative to the mounting point, if the comparison indicates that the first speed does not exceed the second speed by a predetermined amount. The method may include adjusting an amount of electrical power provided from a battery to the drive motor until the first speed of the drive motor equals the second speed of the speed wheel, before advancing the position of the drive motor relative to mounting point. The method may include determining whether a ratio of the first speed divided by the second speed exceeds a threshold value. The method may include using a computer processor to perform the comparison and to send a command to advance the position of the drive motor.

Embodiments of a friction drive system may have a drive assembly including a drive motor and a pivot mechanism. A contact surface may be disposed on the drive motor, and the drive motor may be attached to an end of the pivot mechanism. An automatic traction control system may automatically adjust an angle of the pivot mechanism in response to one or more sensed conditions.

Embodiments of a friction drive system may allow a user to calibrate or adjust the amount of normal force delivered based on their preferences or based on a selected mode of operation. Embodiments of the present disclosure may automatically disengage and reengage the contact surface of a friction drive with the tire (or wheel) of a wheeled vehicle in a safe and efficient manner.

Embodiments of the present disclosure may include an initialization procedure for determining a starting position of the contact surface relative to the tire, which advantageously may allow for rapid engagement with the tire when power is needed. Embodiments of the present disclosure may include a procedure for automatically engaging and disengaging the contact surface with the tire, such that engagement occurs when the motor is delivering power.

As would be understood by a person of skill in the art, embodiments of the present disclosure have applications beyond wheeled vehicles and may be used to improve the function, control, and performance of friction drive systems generally.

The foregoing discussion in the Summary of the Disclosure is for example only and is not intended to limit the scope of the claimed invention(s) or the embodiments described below.

DETAILED DESCRIPTION

Figure 1A:
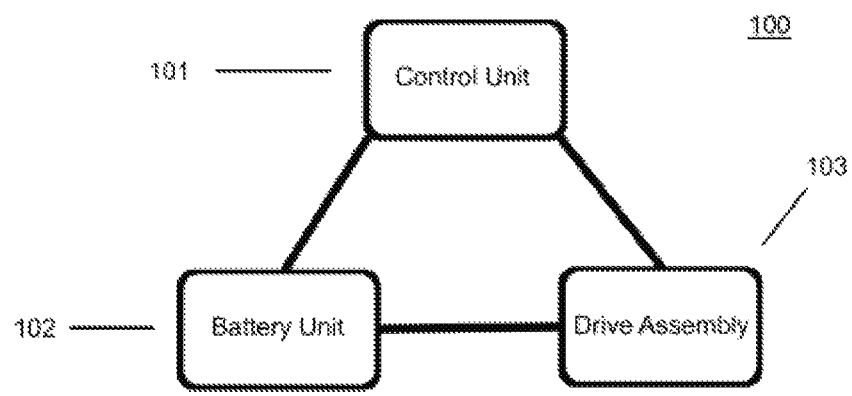
FIG. 1A is a block diagram showing an embodiment of a friction drive system with a battery unit, control unit, and drive assembly.

As shown in FIG. 1A, embodiments of friction drive system 100 include control unit 101, battery unit 102, and drive assembly 103. Battery unit 102 may provide electrical power to control unit 101 and drive assembly 103. Control unit 101 may provide control information (and commands) to battery unit 102 and drive assembly 103. Drive assembly 103 may provide power to a tire (or wheel) of a wheeled vehicle, or it may provide power to a hub or crank assembly of a wheeled vehicle, or it may provide power to another portion of the wheeled vehicle, depending on the particular embodiment. In some embodiments, friction drive system 100 may be provided as one or more separate units which may be mounted to a wheeled vehicle. In other embodiments, friction drive system 100 may be integrated with a wheeled vehicle, for example, as an electric bicycle, scooter, or wheelchair.

Figure 1B:
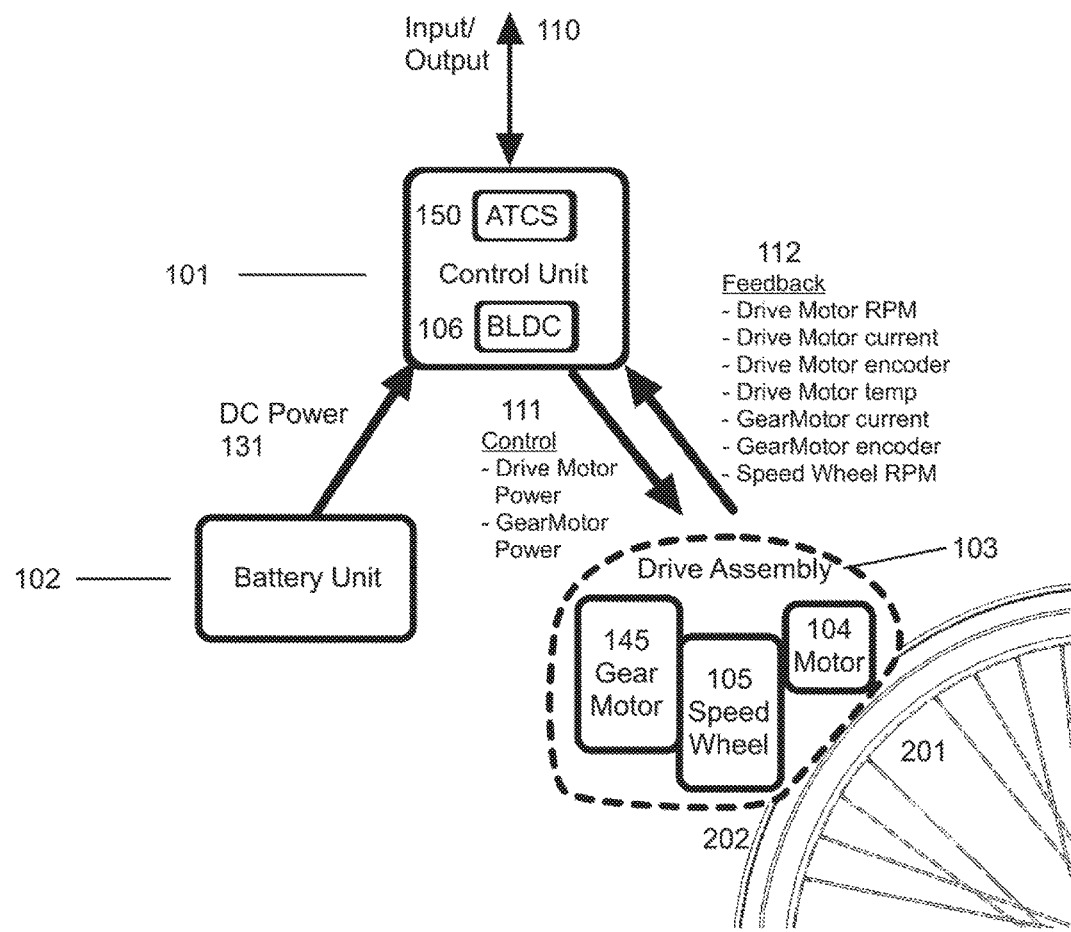
FIG. 1B is a block diagram showing an embodiment of a friction drive system with a battery unit, control unit, and a drive assembly that includes a speed wheel and a motor.

As shown in the embodiment of FIG. 1B, drive assembly 103 may include drive motor 104 and speed wheel 105. Drive assembly 103 may be capable of engaging with tire 202 (or directly with wheel 201), such that drive motor 104 delivers mechanical power to wheel 201. For example, drive assembly 103 may engage with tire 202 via a contact surface disposed on the outer surface of drive motor 104. Control unit 101 may interact with battery unit 102 to control the amount of electrical power delivered to drive motor 104, thereby controlling the amount of mechanical power delivered to wheel 201. Speed wheel 105 may provide information about the speed of tire 202, may be delivered to control unit 101 as part of feedback signal 112.

In embodiments of a friction drive system drive assembly 103 may include one or more rollers (not shown) for delivering power from drive motor 104 to tire 202; in these embodiments, drive motor 104 need not contact the tire directly. Instead, a contact surface may be provided on one or more rollers for delivering mechanical power from drive motor 104 to wheel 201.

As shown in the embodiment of FIG. 1B, control unit 101 may include brushless DC motor controller ("BLDC") 106. BLDC 106 may regulate the delivery of electrical current (and power) from battery unit 102 to drive motor 104 in drive assembly 103. Electrical current may flow from battery unit 102 to BLDC 106 and then to drive assembly 103 via power line 131 and command line 111. BLDC 106 may regulate the amount of current (and power) delivered to drive assembly 103 in response to commands from control unit 101 and/or Automatic Traction Control System ("ATCS") 150. ATCS 150 may contain logic for automatically adjusting an amount of normal force between drive motor 104 and tire 202. ATCS 150 may be implemented as software or firmware instructions executing on a processor within control unit 101, or as stand-alone circuitry. Alternatively, in other embodiments, ATCS 150 may be provided within drive assembly 103, battery unit 102, or separately.

Still referring to FIG. 1B, in some embodiments of a friction drive system, signals may be sent over command line 111 in response to commands issued by control unit 101 and/or ATCS 150. Command line 111 may include three high-power signals for delivering electrical current from BLDC 106 to drive motor 104. Command line 111 also may include signals for powering speed wheel 105 and gear motor 145.

Feedback signal 112 may provide control unit 101 with information from drive assembly 103. For example, feedback signal 112 may contain information about drive motor 104, such as motor revolutions per minute ("RPMs"), motor current draw, motor position, motor phase, and/or motor temperature. Feedback signal 112 also may include information from speed wheel 105, such as RPMs, angular speed, tangential speed, and/or position. Feedback signal 112 also may provide information about the gear motor, including gear motor current and gear motor encoder position. Information contained in feedback signal 112 may be sampled at regular intervals (e.g., every 10 to 20 ms) and stored as data in memory on a rolling basis. Feedback signal 112 may be sent over the same physical cable as command line 111 or over a separate physical cable. For example, feedback signal 112 may include information sent over a Serial or DART connection. Alternatively, feedback signal 112 may be delivered wirelessly using Bluetooth, IEEE 802.11, or other suitable wireless technology.

As shown in 1B, control unit 101 may send and receive information over input/output signal 110 on a physical cable or wirelessly using Bluetooth, IEEE 802.11, or other suitable wireless technology. In embodiments of a friction drive system, a throttle operated by a user may send information over input/output signal 110, where the information may represent an amount of activation of the throttle (e.g., in the form of an analog or digital signal). Control unit 101 may then use the information in determining how much electrical current to deliver to drive assembly 103; for example, the amount of electrical current delivered to drive motor 104 may increase as the throttle is activated further, thereby providing additional power to wheel 201 and increasing the speed of the wheeled vehicle.

Figure 1C:
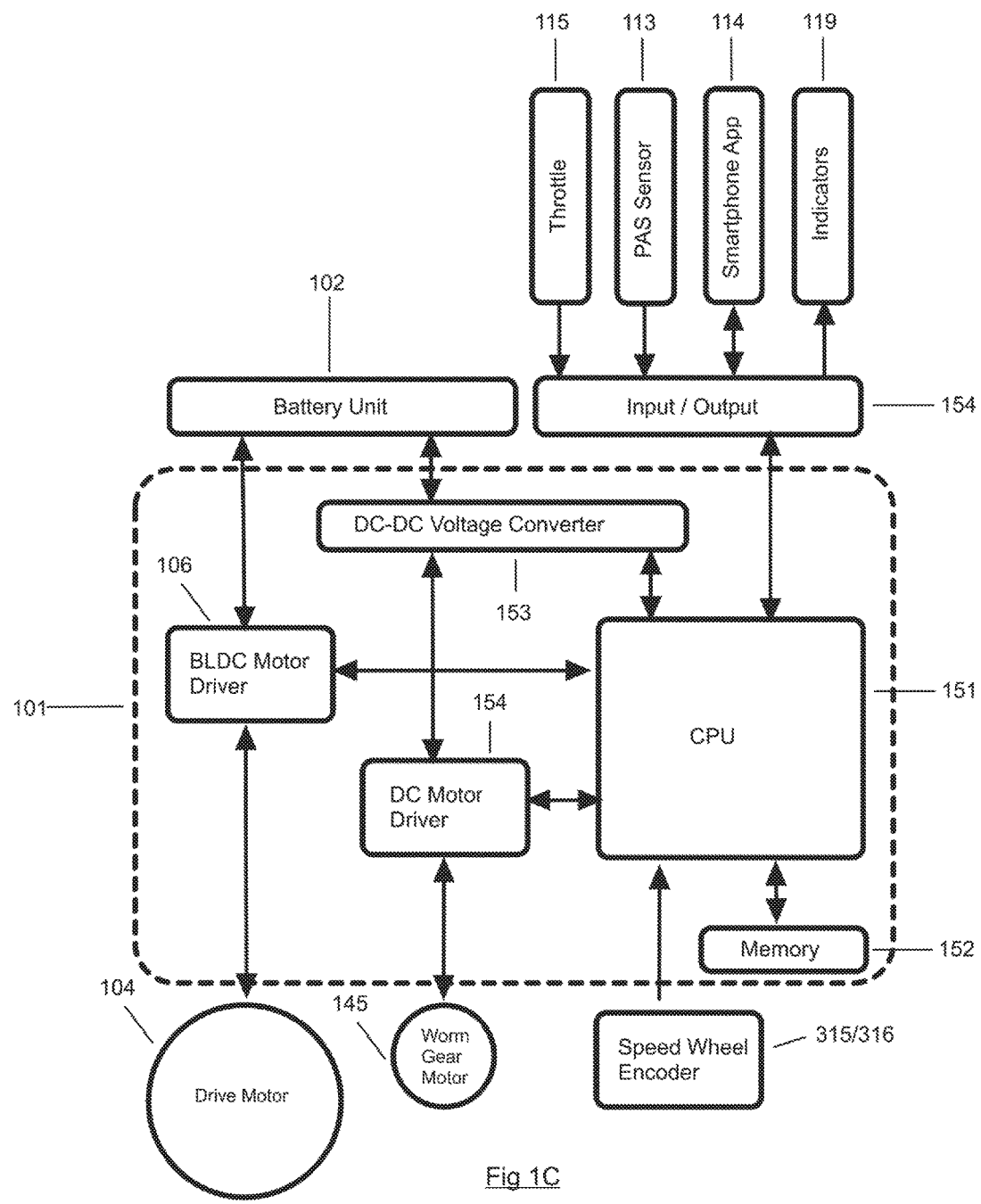
FIG. 1C shows a diagram for a control unit and electrical components in embodiments of a friction drive system.

FIG. 1C shows a connectivity diagram for a control unit and various electrical components in embodiments of a friction drive system. As used herein, "memory" may include RAM, ROM, buffers, registers, or other electronic means of storing information, as would be understood by one of skill in the art in view of the present disclosure. Control unit 101 may include central processing unit ("CPU") 151 and memory 152. In some embodiments, ATCS 150 (not shown) may be stored in memory 152 and execute on CPU 151. CPU 151 may perform instructions stored in memory 152 (for example, as a computer program) and may use information provided with input/output signal 110 and information from drive motor 104, worm gear 145, and speed wheel encoder 315/316 which may be provided as part of feedback signal 112 (not shown). Memory 152 also may store information about the state of friction drive system 100 and/or wheeled vehicle 200, such as vehicle speed, vehicle range, battery power remaining, motor engagement position, and other information. The components within control unit 101 in FIG. 1C may be disposed on one r multiple printed circuit boards ("PCBs"). For example, in some embodiments, CPU 151, memory 152, DC-DC voltage converter 153, and DC motor driver 154 may be disposed on a first PCB; BLDC 106 may be disposed on a second PCB; and the first and second PCB's may be connected by a two-way UART serial interface.

In the embodiment of FIG. 1C, CPU 151 may issue commands that control friction drive system 100. For example, in embodiments of a friction drive system, a program stored in memory 152 and running on CPU 151 may determine an amount of electrical current (and/or power) to supply from battery unit 102 to drive motor 104 and send a command to BLDC 106 to deliver the electrical current, thereby controlling the speed and/or power of drive motor 104. As another example, a program stored in memory 152 and running on CPU 151 may command DC Motor Driver 153 to power worm gear motor 145 and, thereby, cot mount of normal force between drive motor 104 and a tire of a wheeled vehicle, as described further below with respect to FIG. 4. Voltage converter 153 may convert (e.g., step-down) the voltage from battery unit 102 for usage by dc motor driver 154, which delivers power to worm gear motor 145. Input/Output signal 110 may include information from throttle 115, Pedal Assist Sensor ("PAS") 113, smartphone app 114, and indicators 119, some or all of which may be used by CPU 151 to control friction drive system 100. Indicators 119 may be LED status lights to indicate battery state of charge, mode of operation, or other states of the system; indicators 119 may also include a display for providing information such as vehicle speed or range. Moreover, CPU 151 may send information (e.g., battery power remaining or estimated range) over input/output signal 110, for example, for display on smartphone app 114.

Figure 1D:
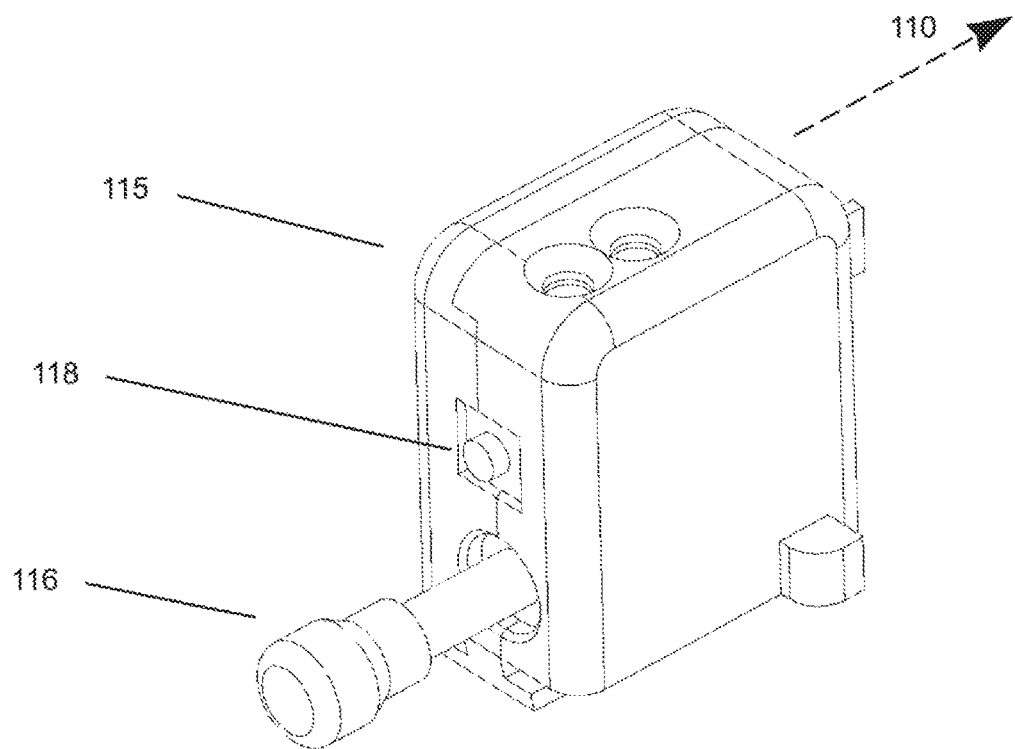
FIG. 1D shows an embodiment of a throttle having a plunger mechanism that may be used with embodiments of a friction drive system.

FIG. 1D shows an embodiment of throttle 115 that generates information sent over input/output signal 110 and delivered to control unit 101. Throttle 115 may include plunger 116, which may be depressed by a user's thumb when a user desires to power drive motor 104. Plunger 116 may include a linear position sensor that generates a signal correlated to the position of plunger 116. Alternatively or in addition, throttle 115 may have a throttle button with a pressure sensor or force sensing resistor that generates a signal correlated to how hard a user presses on the button. In other embodiments, a twist throttle may be used.

Figure 1E:
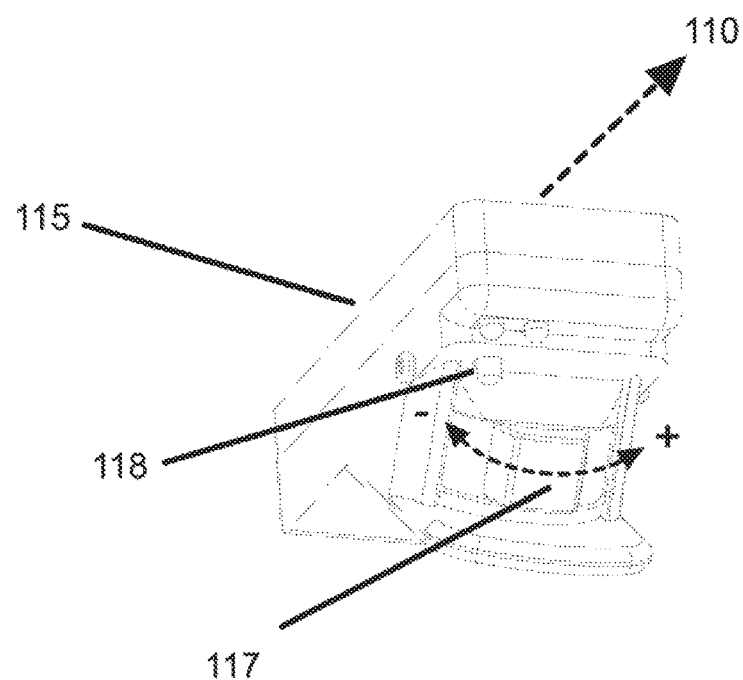
FIG. 1E shows an embodiment of a throttle having a rotating toggle mechanism with throttle and brake that may be used with embodiments of a friction drive system.

FIG. 1E shows an embodiment of throttle 115 having rotating toggle 117 that may be used with embodiments of a friction drive system. In the embodiment of FIG. 1E, information generated by throttle 115 and included with input/output signal 110 may be delivered to control unit 101 over a cable (not shown) or wirelessly. Input/output signal 110 may contain information about the state of rotating toggle 117, which may be actuated by a user in the "+" direction to generate a throttle signal or in the "−" direction to generate a brake signal. When no external pressure is applied to rotating toggle 117, it remains at a central "zero" position, indicating that neither the throttle nor the brake has been applied. Throttle 115 also may include optimize button 118, which may send information on input/output signal 110 when pressed by a user. For example, when optimize button 118 is pressed, embodiments of a friction drive system may initiate a procedure to optimize the normal-force.

In embodiments of a friction drive system, input/output signal 110 may include information generated by both a throttle mechanism and a pedal assist sensor ("PAS"), and this information may be used together to control the delivery of electrical power to drive assembly 103. For example, the PAS may be used to determine the base level of electrical power, while the throttle mechanism may allow the user to provide extra power from the motor as desired. As another example, smartphone app 114 may send information over input/output signal 110 indicating user preferences, such as a desire to disengage the drive motor when power is no longer needed.

Figure 2A:
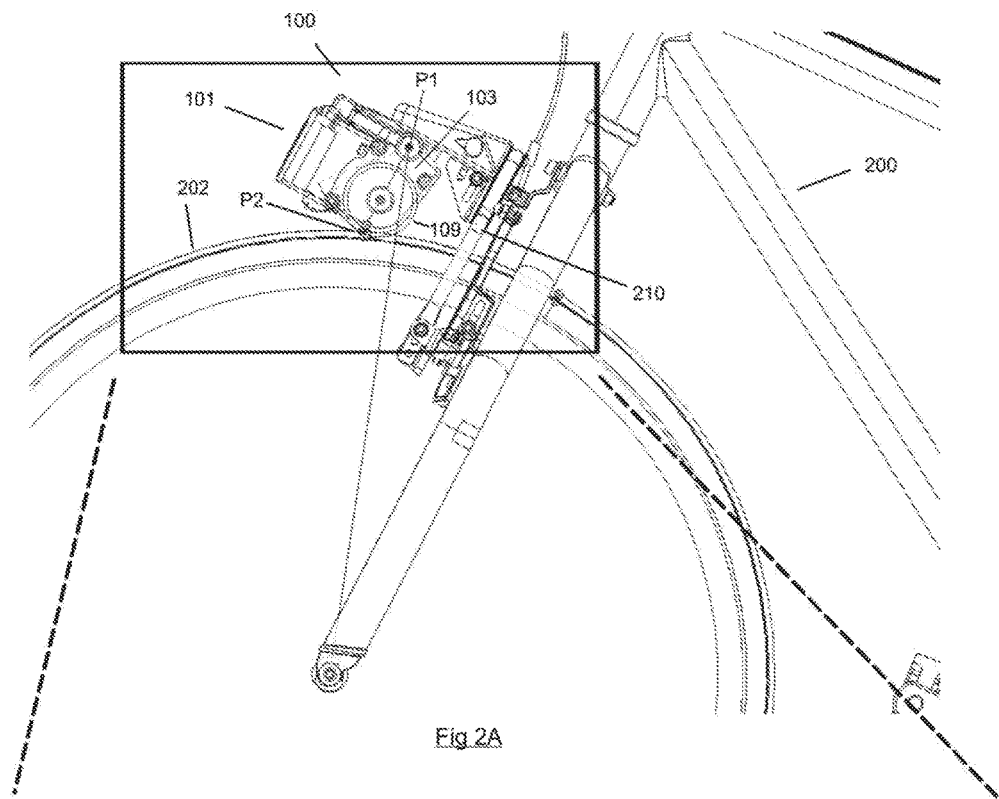
FIG. 2A shows an embodiment of a friction drive system wherein a control unit and a drive assembly are mounted adjacent to a front wheel of a wheeled vehicle such that a contact surface is engaged with the tire; and the drive assembly is capable of pivoting relative to the mount.
Figure 2B:
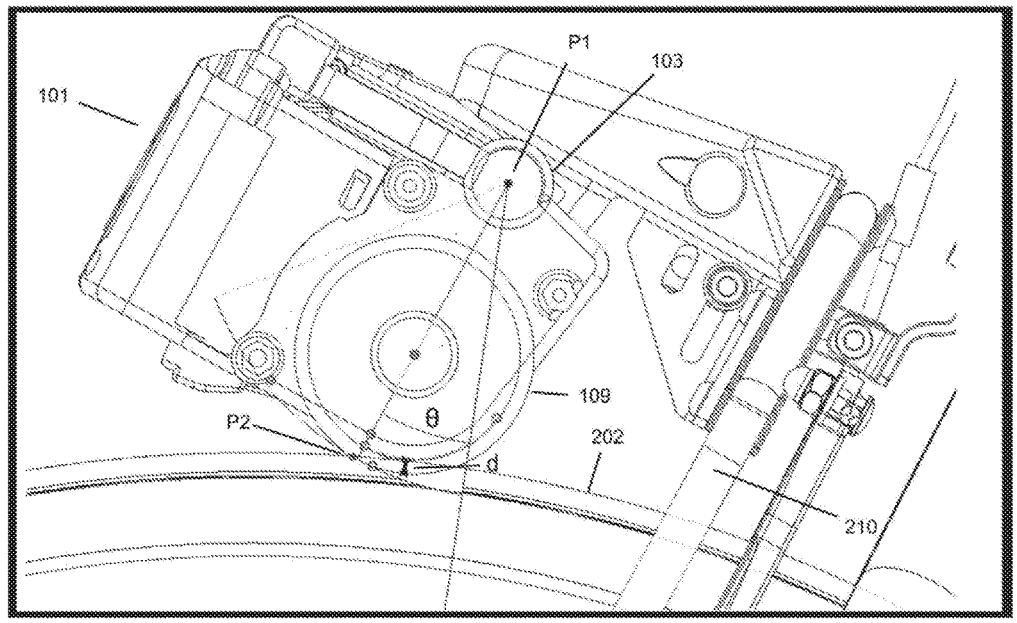
FIG. 2B shows a close-up of the boxed region in FIG. 2A.

FIGS. 2A and 2B show an embodiment of friction drive system 100 wherein control unit 101 and drive assembly 103 are mounted to mount 210 on wheeled vehicle 200. FIG. 2B shows a close-up view of the boxed region in FIG. 2A. As shown in FIGS. 2A and 2B, in some embodiments of a friction drive system, the amount of normal force between contact surface 109 and tire 202 may be determined by distance d which contact surface 109 presses into tire 202 (for a tire with constant internal air pressure). An angle θ may be defined as the angle between the center of wheel 201 and pivot point P1 of drive assembly 103 relative to the line from P1 through the center of drive motor 104. Decreasing angle θ towards 0 degrees increases distanced and the amount of normal force, $F_N$. As previously explained, the amount of friction is proportional to the normal force (for a given coefficient of friction, μ). Therefore, in some embodiments, the amount of friction may be controlled through angle θ. The distance between P1 and P2, where P2 is the intersection of the outer edge of contact surface 109 with the line from P1 through the center of drive motor 104, determines how much angle θ must vary to increase distance d by a given amount at a given position of angle θ.

In embodiments of a friction drive system deployed on a non-compressible tire (e.g., hard urethane or solid rubber) or wheel (e.g., hard urethane, plastic, or metal), where distance d does not change, the amount of normal force may still be increased by increasing angle θ, because mount 210 has some flex which makes increasing angle θ possible and, thus, allows the normal force to increase.

In some embodiments of a friction drive system, contact surface 109 of drive assembly 103 may always be engaged with tire 202. In other embodiments of a friction drive, contact surface 109 may engage and disengage with tire 202 automatically, as needed, or in response to a request by the user. In some embodiments, contact surface 109 may be a rubberized drive belt disposed about the rotor of drive motor 104. For example, contact surface 109 may be a rubberized belt made from a urethane compound optimized for a high coefficient of friction in wet and dry conditions and selected for minimum abrasion with a tire; the rubberized belt may be replaceable for maintenance and customization; and the rubberized belt may have surface groove patterns to improve grip with a tire.

Figure 3:
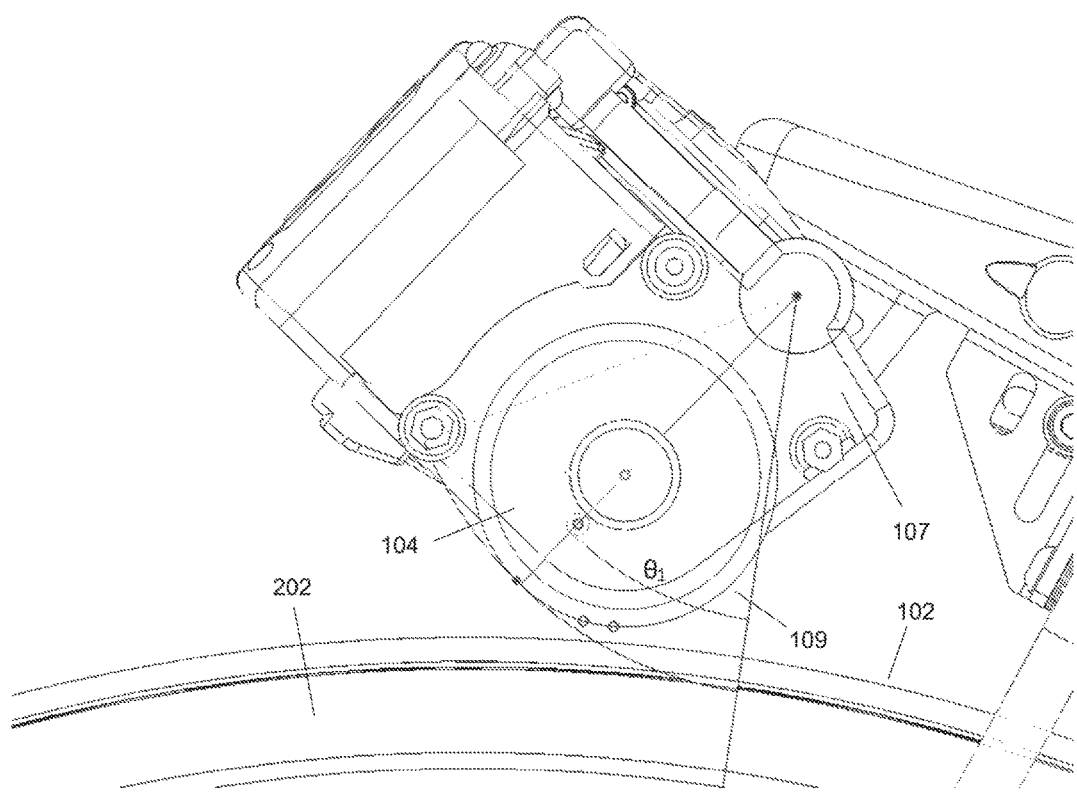
FIG. 3 shows an embodiment of a drive assembly where an angle of a pivoting mechanism initially is set to a disengaged position relative to a tire, but the pivoting mechanism may swing into an engaged position using motor torque or by a secondary motorized pivot control mechanism.

As shown in the embodiment of FIG. 3, starting value $θ_1$ of angle θ may be set such that contact surface 109 is disengaged from tire 102 when drive motor 104 is not running. When powered, drive motor 104 generates torque that pulls pivot arm 107 into tire 202. A biasing force (e.g., from a spring mechanism, not shown) may return pivot arm 107 to its starting position when drive motor 104 is unpowered. Thus, embodiments of a friction drive system may automatically engage and/or disengage contact surface 109 with tire 202 using torque from drive motor 104, thereby eliminating drag on the system and preventing wear when drive motor 104 is not in use.

Alternatively, in other embodiments of a friction drive system, starting value $θ_1$ may be set to engage contact surface 109 with tire 202 and to provide enough friction to power wheel 201 during normal conditions (e.g., dry surface and fully inflated tire). Value $θ_1$ may be preset, determined through calibration, set when mount 210 is installed, and/or set when drive assembly 103 is coupled to mount 210. When angle θ is decreased by a predetermined amount from $θ_1$, the normal force and the amount of friction increases, thereby preventing slippage between contact surface 109 and tire 202, for example, in wet or slippery conditions. On the other hand, when angle θ is increased by a predetermined amount from Or, contact surface 109 disengages by completely losing contact with tire 102. For example, it may be desirable to disengage contact surface 109 from tire 202 when drive motor 104 is not providing power in order to prevent drag on wheel 201, which could slow vehicle 200. Disengaging contact surface 109 from tire 202 also may prevent wear to tire 202 and motor drive assembly 103.

Alternatively, in still other embodiments of a friction drive system, control unit 101 (and ATCS 150) may control angle θ in response to input signal 110 and feedback signal 112. For example, control unit 101 may perform calculations and/or lookup values from a table to determine a desired value of angle θ in response to various inputs provided with input signal 110 and feedback signal 112. Control unit 101 may then set angle θ to the desired value, for example, by sending commands to a worm gear motor, as described in relation to FIG. 4; angle θ may be measured using a position encoder or as a function of gear motor current, thereby allowing control unit 101 to determine when angle θ has reached a desired value.

Figure 4:
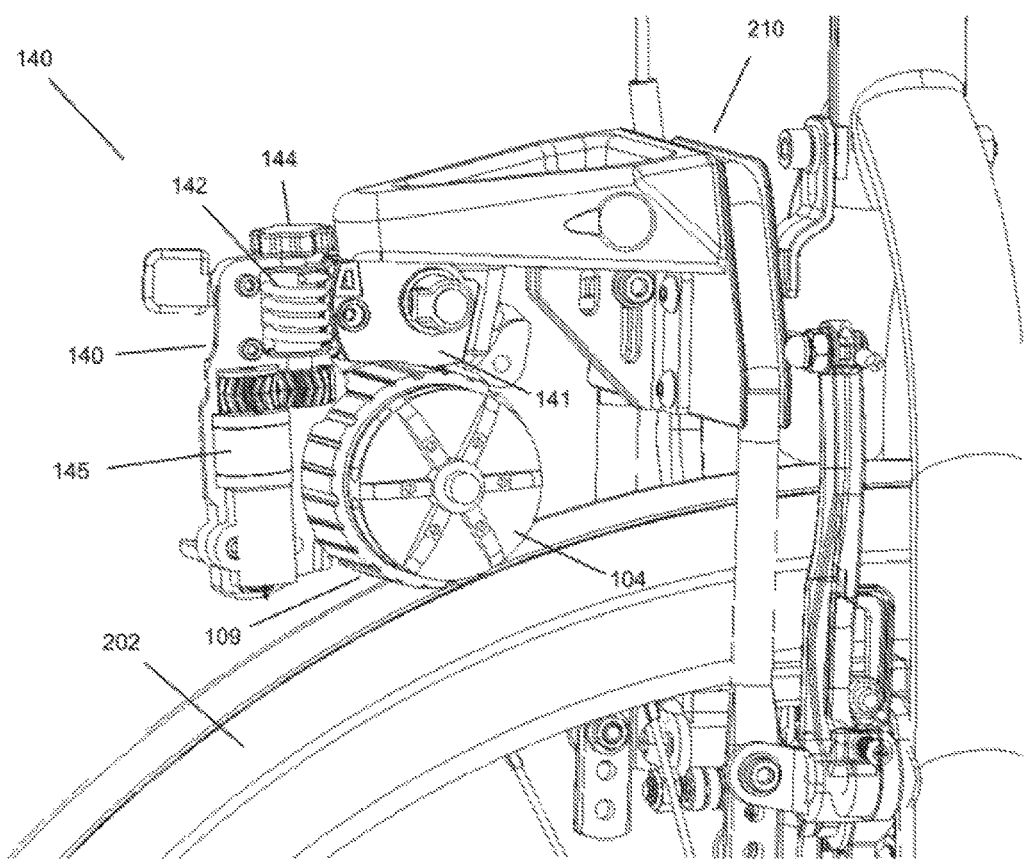
FIG. 4 shows an embodiment of a drive assembly having a worm gear for controlling an angle of a pivot bracket on the drive assembly and, thus, an amount of normal force between a contact surface on the drive assembly and a tire.

FIG. 4 shows an embodiment of drive assembly 103 having motor mount assembly 140, pivot bracket 141, and worm gear 142. Motor mount assembly 140 is designed to couple securely with mount 210 on wheeled vehicle 200. Motor mount assembly 140 includes pivot bracket 141, which has worm wheel teeth for engaging with worm gear 142; the worm wheel teeth on pivot bracket 141 are disposed about a shape that forms between 45° to 60° of the circumference of a worm wheel (depending on the specific embodiment), which causes worm gear 142 (and drive motor 104) to rotate about pivot bracket 141 as worm gear 142 is turned. By turning worm gear 142, an angular position of drive assembly 103 relative to pivot bracket 141 may be controlled, thereby determining an amount of normal force between contract surface 109 and tire 202. In some embodiments, pivot bracket 141 may have a pre-set pivot range of about 30° from a starting position of full retraction relative to motor mount assembly 140; a position of first engagement with tire 202 may be at about 5° to 10° from full retraction. Worm gear position encoder 147 (not shown) may detect a position of worm gear 142, which may be provided as feedback to control unit 101. Contact surface 109 may be a rubberized belt disposed about drive motor 104 for improved grip with tire 202.

As shown in FIG. 4, pivot bracket 141 may be fixed relative to mount 210 (and, thus, fixed relative to wheeled vehicle 200) and have a rounded circumference with teeth capable of engaging with worm gear 142; worm gear 142 may be anchored to motor mount assembly 140. The relative position of worm gear 142 may be used to control an amount of normal force between contact surface 109 and tire 202. For example, turning worm gear 142 such that contact surface 109 moves towards tire 202 may increase the normal force and, thus, the resulting friction force, where the coefficient of friction remains constant. Advantageously, in cases where the coefficient of friction suddenly drops—for example, because tire 202 gets wet—embodiments of a friction drive system may increase the normal force to keep the amount of friction force relatively constant, thereby preventing slippage between contact surface 109 and tire 202.

In the embodiment of FIG. 4, worm gear 142 may be rotated manually via knob 144 or automatically with gear motor 145 in response to signals provided by control unit 101 on command line 111. In some embodiments, gear motor 145 may be a stepper motor, a standard DC motor, or other motor capable of controlling worm gear 142. In some embodiments, both knob 144 for manual adjustment and gear motor 145 for automatic adjustment may be provided, thereby allowing a user to manually calibrate the system through knob 144 while also benefiting from automatic traction control during normal use. Furthermore, rather than knob 144, another control may be used to allow the user to manually adjust the normal force; for example, a slider or dial may be provided on friction drive system 100 or on throttle 115.

In some embodiments of a friction drive system, gear motor 145 may be a standard DC motor, where motor current draw is proportional to normal force. Control unit 101 may determine (e.g., by performing a calculation or a table lookup) an amount of normal force by monitoring the motor current draw. In some embodiments, a rapid increase in motor current draw may be used to determine when worm gear 142 is at its maximum position; alternatively, an actual position of worm gear 142 may be monitored using worm gear position encoder 147. Furthermore, in some embodiments, it may be determined when contact surface 109 disengages from tire 202 by monitoring the speed (and/or RPM) of drive motor 104, because the speed of drive motor 104 will increase suddenly when drive motor 104 is no longer engaged with tire 202 but remains powered.

Figure 5:
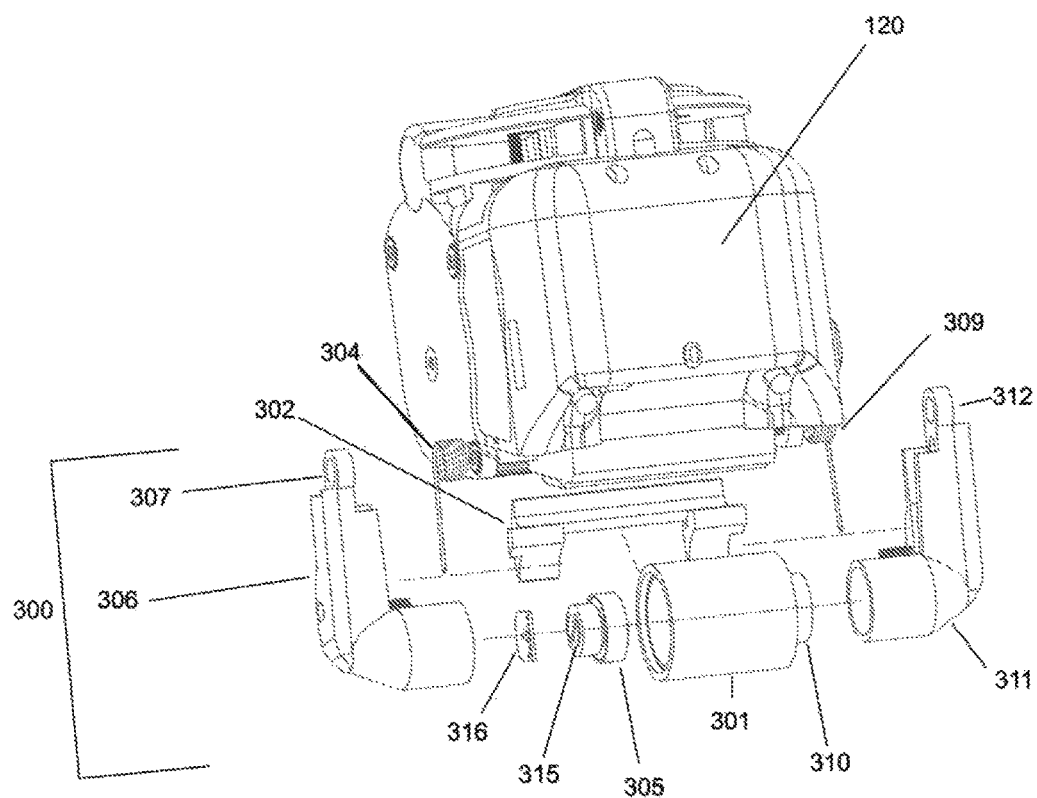
FIG. 5 shows an exploded view of a speed wheel assembly.

FIG. 5 shows an exploded view of an embodiment of a speed wheel assembly provided with a drive assembly. Speed wheel assembly 300 includes roller wheel 301, which is designed to contact the surface of a tire above which drive assembly 103 is mounted. Support bridge 302 adds rigidity between the two independently sprung arms, allowing the assembly to maintain constant pressure on and a level orientation with the tire. Speed wheel assembly 300 further includes right arm 306, which connects to roller wheel 301 by right bearing 305 and attaches to case 120 by right pivot joint 307. Right torsion spring 304 provides tension that drives right arm 306 and roller wheel 301 downward (e.g., towards a tire when mounted to a vehicle). Similarly, speed wheel assembly 300 includes left arm 311, which connects to roller wheel 301 by left bearing 310 and attaches to drive assembly 103 by left pivot joint 312. Left torsion spring 309 provides tension that drives left arm 311 and roller wheel 301 downward (e.g., towards a tire when mounted to a vehicle). Ideally, the tension provided by right and left torsion springs 304 and 309 should be equal to provide a constant downward pressure along the length of roller wheel 301. The use of dual arms—right arm 306 and left arm 311—provides extra strength and stability to speed wheel assembly 300, which may be subjected to significant forces when in contact with a tire of a moving vehicle, for example, when going over bumps in the road; dual arms also reduces axial loads on the bearings, which improves their performance and improves lifespan. Encoder magnet 315 and encoder PCB 316 may be provided at the right bearing (as shown) or at the left bearing (not shown). Encoder PCB 316 senses the rotation of encoder magnet 316 and may deliver a signal to control unit 101 (e.g., via feedback signal 112) that may be used to determine the rotational speed of roller wheel 301.

In some embodiments, the diameter of speed wheel 301 may be large enough to provide accurate and consistent measurements, but small enough for portability. For example, the diameter of speed wheel 301 should be large enough to avoid bouncing off of the tire when it hits the treads. In particular, a diameter of between 25 mm to 35 mm for speed wheel 301 provides an optimal balance between accuracy and portability, in some embodiments of a friction drive system compatible with a bicycle. In addition, the outer surface of speed wheel 301 may have a high-friction and non-abrasive surface to avoid slippage with tire 202; in some embodiments, a urethane belt may be disposed about the outer surface of speed wheel 301. Moreover, in some embodiments, an angular range of motion of right arm 306 and left arm 311 relative to case 120 may allow speed wheel 301 to remain in contact with a tire (when mounted) throughout the entire range of motion of drive assembly 103—specifically, from a position of full disengagement to maximum normal force. In this way, speed wheel 301 may provide an accurate measurement of the tire's speed, regardless of the state of engagement.

Figure 6:
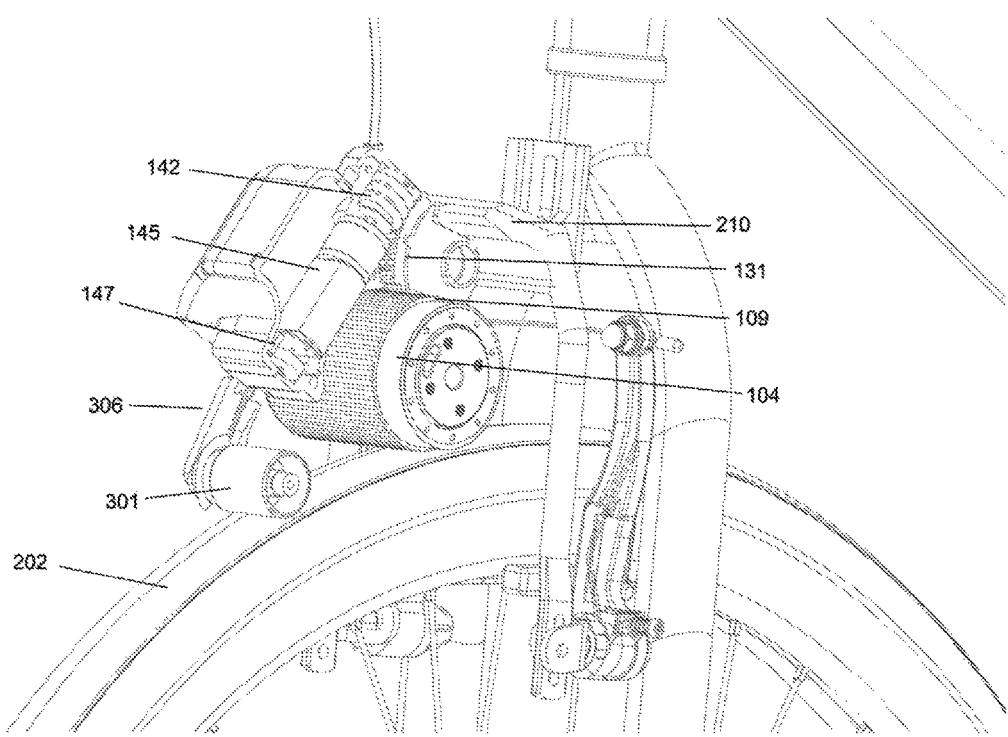
FIG. 6 shows a cutaway view of a drive assembly with a speed wheel mounted to a bicycle.

FIG. 6 shows a cutaway view of a drive assembly with a speed wheel mounted to a bicycle. In the embodiment of FIG. 6, control unit 101 is integrated with drive assembly 103, which includes speed wheel assembly 300. Battery unit 102 (not shown) may be mounted separately to the vehicle and connected via a cable to control unit 101. In the embodiment of FIG. 6, drive assembly 103 is mounted to a bicycle above tire 202, and roller wheel 301 is in continuous contact with tire 202. Roller wheel 301 may have a rubberized non-slip surface to prevent slippage with tire 202. During normal operation, the surface of roller wheel 301 is in constant contact with tire 202, and the tangential speed of roller wheel 301 should equal the tangential speed of tire 202. The tangential speed of roller wheel 301 may be calculated from the rotational speed of roller wheel 301 using the radius, which is known. Thus, speed wheel assembly 300 allows control unit 101 to accurately determine the tangential speed of tire 202.

The embodiment of FIG. 6 includes a worm gear assembly with worm gear 142 and worm gear motor 145. As explained with respect to FIG. 4 above, the position of worm gear 142 relative to pivot bracket 141 may be used to control an amount of normal force between contact surface 109 and tire 202. The position of worm gear 142 may be set manually by a user or automatically controlled by control unit 101 via worm gear motor 145, or both. Drive motor 104 also may be completely disengaged by retracting worm gear 142 such that contact surface 109 no longer contacts tire 202. When disengaged, drive motor 104 cannot deliver power to tire 202 or wheel 201. Nonetheless, in the embodiment of FIG. 6, speed wheel 301 remains engaged with tire 202, even when drive motor 104 is disengaged; thus, speed wheel 301 may continue to measure the speed of tire 202.

Figure 7A:
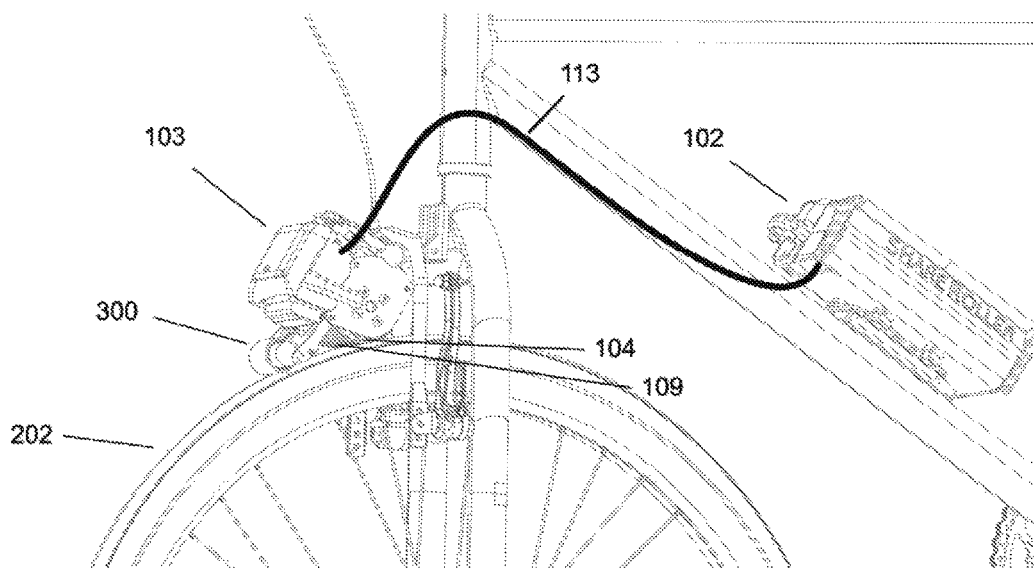
FIG. 7A shows an embodiment of a friction drive system with a speed wheel, where a battery unit is mounted to the frame of a bicycle, and a drive assembly unit is mounted above the front wheel.

FIG. 7A shows an embodiment of a friction drive system with a speed wheel, where battery unit 102 is mounted to the frame of a bicycle, and assembly unit 103 is mounted above front wheel 201. Control unit 101 is integrated with drive assembly 103, and drive assembly 103 includes speed wheel assembly 300. Battery unit 102 may connect to control unit 101 by cable 113.

Figure 7B:
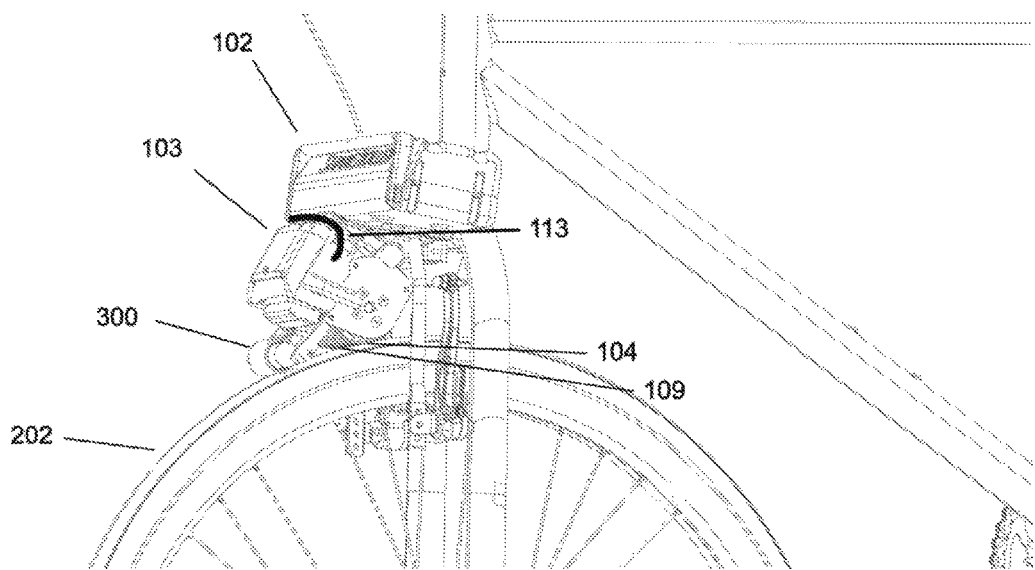
FIG. 7B shows an embodiment of a friction drive system with a speed wheel, where the entire friction drive system is mounted above the front wheel.

FIG. 7B shows an embodiment of a friction drive system with a speed wheel, where the entire friction drive system is mounted above the front wheel by coupling with mounting mechanism 121. In particular, mount 210 may include separate attachment sections for assembly unit 103 and battery unit 102.

Figure 8A:
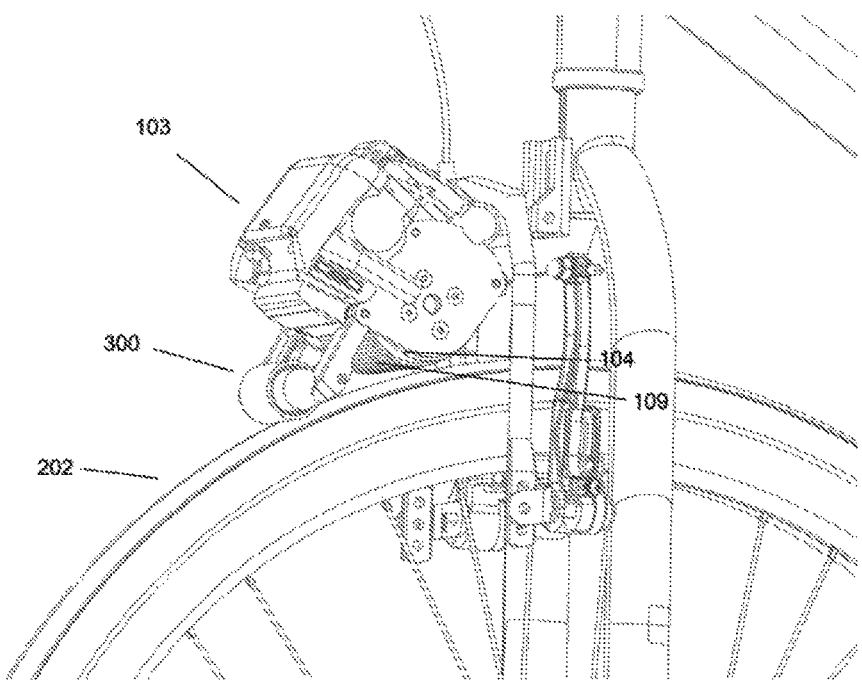
FIG. 8A shows an embodiment of a friction drive system with a speed wheel, where a contact surface of the motor is disengaged with a tire of a bicycle.
Figure 8B:
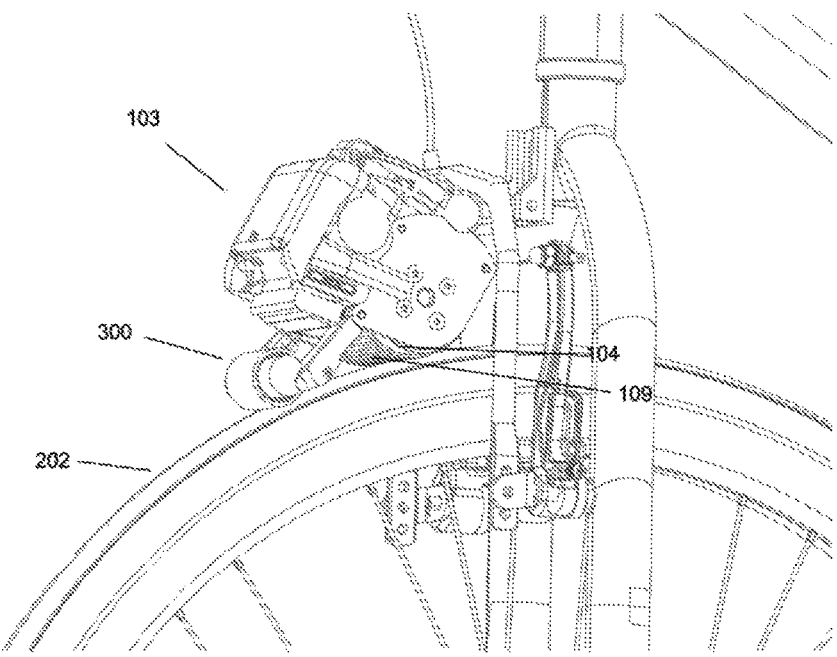
FIG. 8B shows an embodiment of a friction drive system with a speed wheel, where a contact surface of the motor is engaged with a tire of a bicycle.

As shown in FIGS. 8A and 8B, in embodiments of a friction drive system, contact surface 109 may be selectively engaged or disengaged from tire 202 while speed wheel assembly 300 remains in contact with tire 202. The state of engagement may be controlled by powering worm gear motor 145, for example, in response to commands from control unit 101. In FIG. 8A, contact surface 109 is disengaged with tire 202; in FIG. 8B contact surface 109 is engaged with tire 202.

In the embodiment of FIGS. 8A and 8B, control unit 101 may initialize engagement between contact surface 109 and tire 202. Friction drive system 100 may be configured to start with contact surface 109 disengaged from tire 202, as shown in FIG. 8A. For example, worm gear 142 (powered by gear motor 145) may return to a starting position whenever friction drive system 100 is powered down (or powered on). In the starting position, contact surface 109 may not engage with tire 202 when mounted to wheeled vehicle 200. Advantageously, returning to a disengaged position whenever friction drive system 100 is powered down may facilitate rapid removal and installation of friction drive system 100 from/to wheeled vehicle 200. In some embodiments, worm gear 142 may act to disengage contact surface 109 from tire 202 whenever power from drive motor 104 is not required (or desired), such as when the throttle is not activated for a period of time or in response to a user input (e.g., through a throttle or smartphone app).

Figure 9:
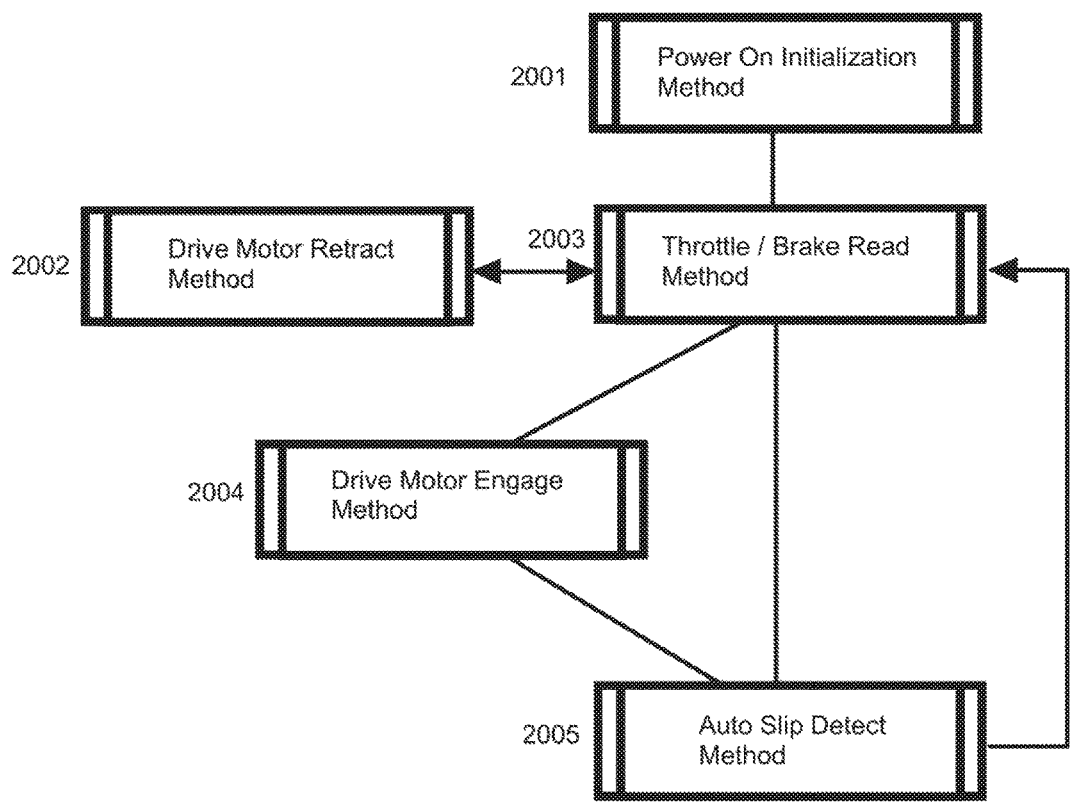
FIG. 9 shows a high-level method for controlling drive motor power and position in embodiments of a friction drive system with automatic traction control.
Figure 10:
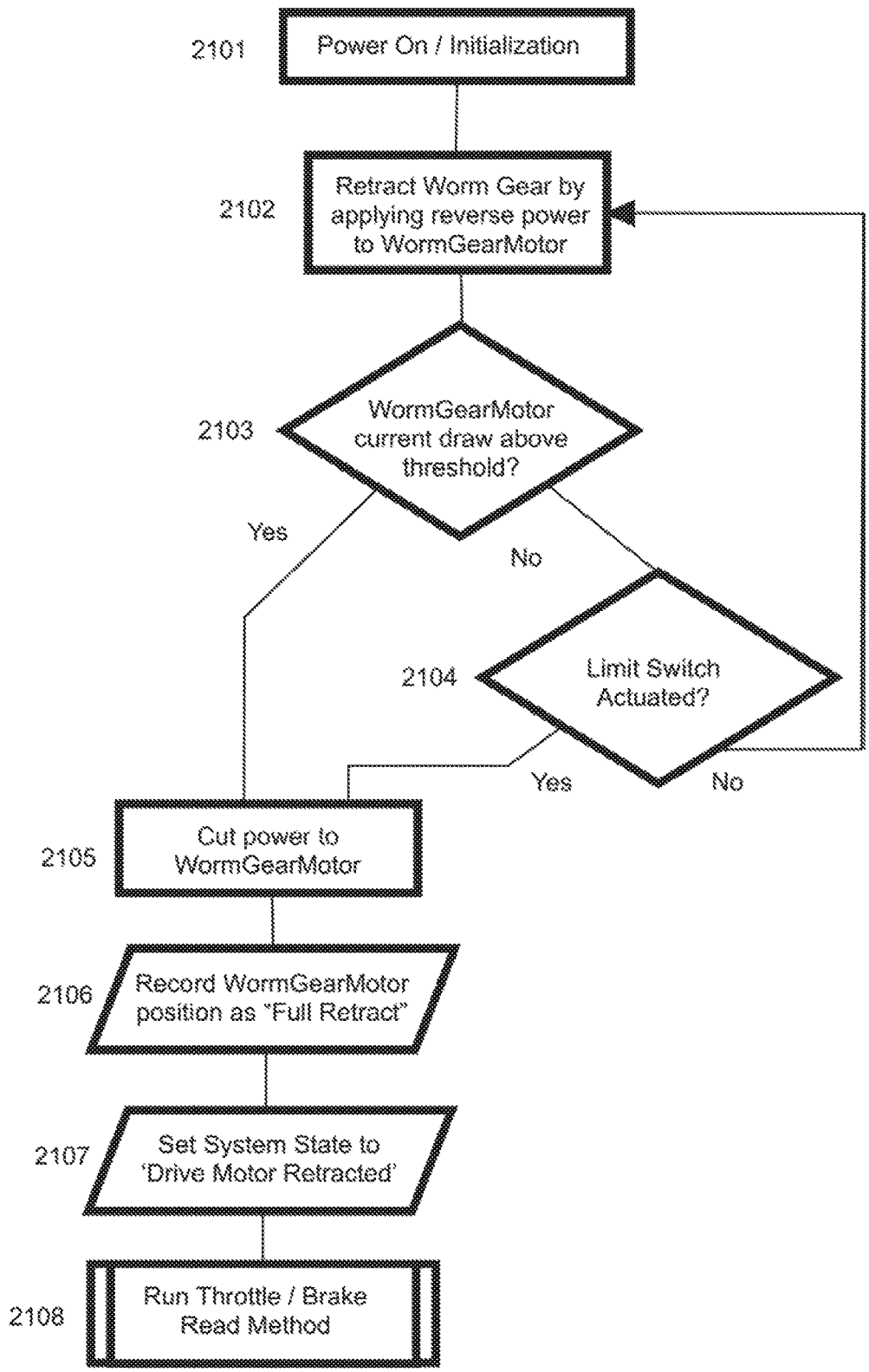
FIG. 10 shows a method for power-on initialization in embodiments of a friction drive system.
Figure 11:
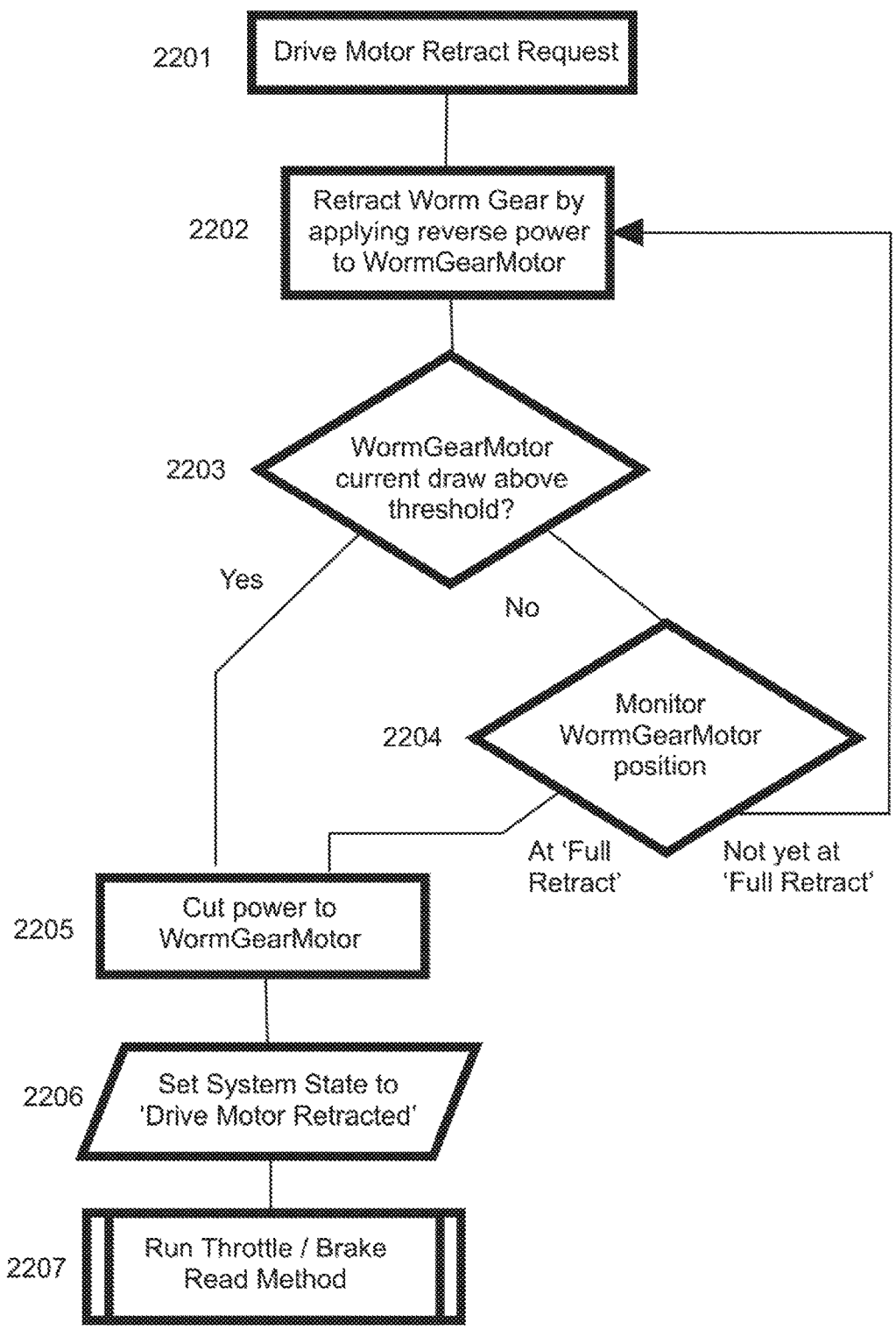
FIG. 11 shows a method for retracting a drive motor in embodiments of a friction drive system.
Figure 12:
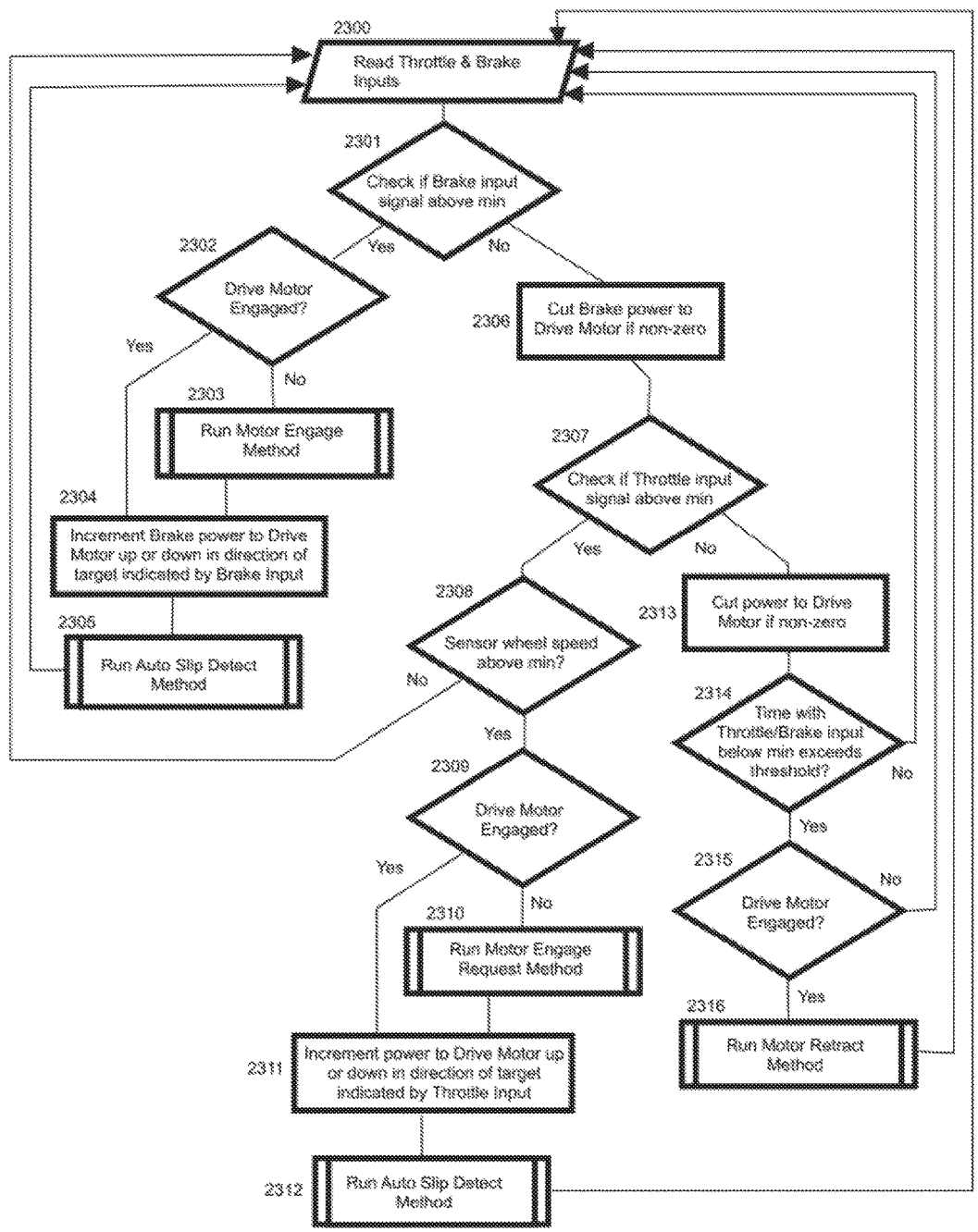
FIG. 12 shows a method for providing power to a drive motor in response to throttle and brake signals in embodiments of a friction drive system.
Figure 13:
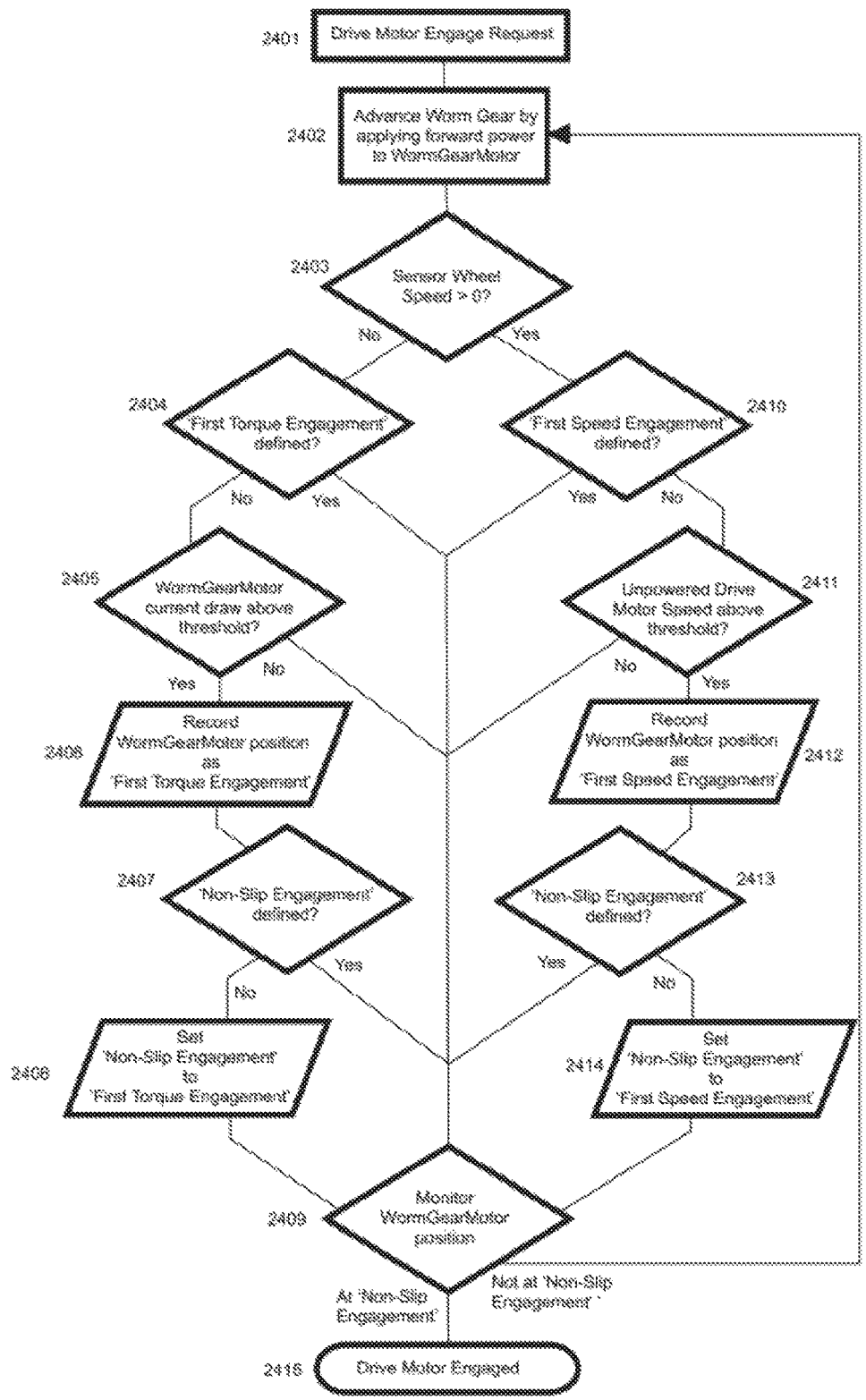
FIG. 13 shows a method for engaging a drive motor with a tire in embodiments of a friction drive system.
Figure 14:
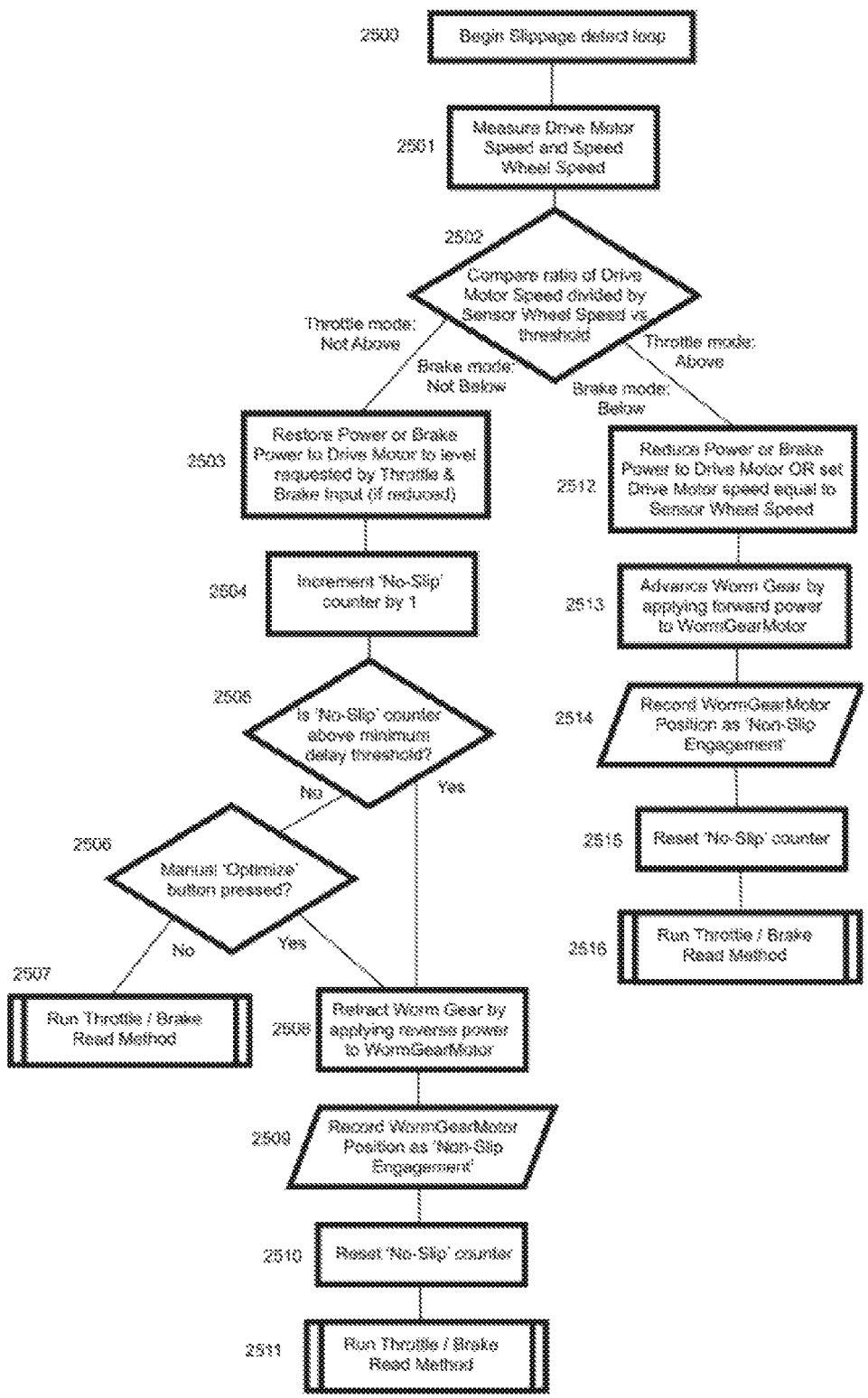
FIG. 14 shows a method for automatically correcting slippage in embodiments of a friction drive system.

FIG. 9 shows a high-level method for controlling drive motor power and position in embodiments of a friction drive system with automatic traction control. First, in step 2001, control unit 101 runs a power-on initialization method, for example, as shown in FIG. 10. Next, in step 2003, control unit 101 runs a throttle/brake read method that continuously looks for signals from the throttle and brake, for example, as shown in FIG. 12. From step 2003, when control unit 101 determines that drive motor 104 should be retracted, step 2002 may be called to run a drive motor retract method, for example, as shown in FIG. 11. From step 2003, when control unit 101 determines that drive motor 104 should be engaged, step 2004 may be called to run a drive motor engage method, for example, as shown in FIG. 13. From steps 2003 or 2004, when control unit 101 determines that slippage should be detected (and corrected, if necessary), step 2005 may be called to run an auto-slip detect method, for example, as shown in FIG. 14.

FIG. 10 shows a method for power-on initialization in embodiments of a friction drive system, which may be performed by control unit 101 in response to instructions stored in memory. In step 2101, the power-on state is detected. In step 2102, worm gear 142 is retracted incrementally by applying reverse power to worm gear motor 145, thereby moving contact surface 109 away from tire 202 (when the system is mounted, as shown in FIGS. 8A and 8B). In step 2103, control unit 101 checks if the worm gear motor current s above a threshold value; the threshold value may be set to correspond to a position of maximum (or substantial) retraction of worm gear 142, since the worm gear motor current will spike when worm gear 142 cannot retract further. If yes (current above threshold), then in step 2105, power to worm gear motor 145 is cut. Next, in step 2106, the position of worm gear motor 145 (and/or worm gear 142), read through worm gear motor position encoder 147, is recorded as a position of "full retract." Next, in step 2107, the system is set (e.g., to "Drive Motor Retracted") to indicate that drive motor 104 is retracted. Next, in step 2108, control unit 101 begins executing the throttle/brake read method, as shown in step 2003 of FIG. 9.

With respect to step 2106, in alternative embodiments, the position of "full retract" could be a zero start point from which to measure revolutions of worm gear motor 145. In alternative embodiments without worm gear encoder 147, the position of "full retract" could be a zero start point for measuring time periods when worm gear motor 145 is powered in a forward or backwards direction; since worm gear motor 145 should rotate at a nearly constant speed, the time in motion powered) may be used to estimate the position of worm gear motor 145 relative to zero.

Returning to step 2103, if no (worm gear current below threshold), then the flow moves to step 2104, and control unit 101 checks whether a limit switch has been activated. In particular, in some embodiments of a friction drive system, a limit switch may be provided on drive motor assembly 103 at a location near to pivot bracket 141 to detect when drive assembly 103 reaches a position of full retraction. For example, when drive assembly moves into a position of full retraction, it may trigger the limit switch, which may be read by control unit 101. If the limit switch has not been activated, then flow returns to step to 2102. If the limit switch has been activated, then flow proceeds to step 2105 and continues as described in the preceding paragraph.

In alternative embodiments of a friction drive system where a limit switch is not provided, step 2104 may be skipped altogether, in which case a "no" in step 2103 would return to step 2102. In yet other embodiments of a friction drive system, control unit 101 may monitor for activation of the limit switch in step 2103 and not monitor the worm gear current draw.

FIG. 11 shows a method for retracting a drive motor after power-on initialization in embodiments of a friction drive system. In step 2201, control unit 101 receives a drive motor retract request. In step 2202, worm gear 142 is retracted incrementally by applying reverse power to worm gear motor 145, thereby moving contact surface 109 away from tire 202 (when the system is r counted, as shown in FIGS. 8A and 8B). In step 2203, control unit 101 checks if the worm gear motor current is above a threshold value. If yes (current above threshold), then in step 2205, power to worm gear motor 145 is cut. Next, in step 2206, the system state is set (e.g., to "Drive Motor Retracted") to indicate that drive motor 104 is retracted. Next, in step 2207, control unit 101 continues executing the throttle/brake read method, as shown in step 2003 of FIG. 9.

Returning to step 2203 of FIG. 11, if no (current below threshold), then in step 2204 control unit 101 monitors the position of worm gear motor 145 (and/or worm gear 142) using worm gear position encoder 147 to determine if it has reached the position of "full retract" recorded in step 2106 of FIG. 9. If yes (at "full retract"), then flow proceeds to step 2205, as described in the preceding paragraph. If no (not at "full retract"), then flow returns to step 2202 and worm gear 142 is again incrementally retracted before returning to step 2203. The method of FIG. 11 is preferred for retracting drive motor 104 after power-on initialization, because monitoring the position of worm gear motor 145 using worm gear position encoder 147 provides a more precise measurement and it avoids unnecessary wear on gear motor 145. Alternatively, in other embodiments of a friction drive system, control unit 101 could use the same method described in FIG. 10 for responding to a retract request.

FIG. 12 shows a method for responding to throttle and brake inputs in embodiments of a friction drive system. In step 2300, control unit 101 reads the throttle and brake input signals on input/output signal 110. In step 2301, control unit 101 checks if the brake input is above a minimum value. If yes (brake input above minimum), then in step 2302 control unit 101 checks if drive motor 104 is engaged, for example, by checking a system state variable. If yes (drive motor engaged), then in step 2304 braking power to drive motor 104 is incremented up or down in the direction of a target level of braking (e.g., reverse torque). A target level of braking (or drive motor power, torque, or RPM) may be determined from information in input/output signal 110 indicating the strength of the brake signal, for example, using a lookup table and/or a calculation. Next, in step 2305, an auto-slip detect method is initiated, for example, as shown in FIG. 14. Returning to step 2302, if no (drive motor not engaged), then in step 2303 control unit 101 runs a method for engaging drive motor 104, for example, as shown in FIG. 13. After completing the engagement in step 2303, flow proceeds to step 2304, already described above.

Returning to step 2301, if no (brake input below minimum), then in step 2306 any braking power to drive motor 104 is cut. Next, in step 2307, control unit 101 checks if the throttle input is above a minimum value. If yes (throttle input above minimum), then in step 2308, control unit 101 checks if the speed of speed wheel 301 (which is directly correlated to vehicle speed) is above a minimum value. If no (speed wheel speed below minimum), then flow returns to step 2300 and repeats. If yes (speed wheel speed above minimum), then in step 2309, control unit 101 checks if the drive motor is engaged. If yes (drive motor engaged), then in step 2311 power to drive motor 104 is incremented up or down in the direction of a target level of power (or torque, current, or RPM). A target level of power (or drive motor torque, current, or RPM) may be determined from information in input/output signal 110 indicating the strength of the throttle signal (and/or desired acceleration), for example, using a lookup table and/or calculation. Next, in step 2312, an auto-slip detect method is initiated, for example, as shown in FIG. 14. Returning to step 2309, if no (drive motor not engaged), then in step 2310 control unit 101 runs a method for engaging drive motor 104, for example, as shown in FIG. 13. After completing the engagement in step 2310, flow proceeds to step 2311, already described above.

Returning to step 2307, if no (throttle input below minimum), then in step 2313 any power to drive motor 104 is cut (or set to zero). Next, in step 2314 control unit 101 checks if a time with both throttle and brake input signals below the respective minimum values exceeds a threshold time (e.g., timeout). If no (below threshold time), then flow returns to step 2300 and repeats. If yes (above threshold time), then control unit 101 checks if drive motor 104 is engaged. If yes (drive motor engaged), then control unit 101 runs a method to disengage the drive motor, for example, using the method of FIG. 11, and then returns to step 2300 and repeats. If no (drive motor disengaged), then flow returns to step 2300 and repeats. In some embodiments, the threshold time in step 2314 may be set to 1 or more minutes to avoid repeatedly engaging and disengaging drive motor 104. Nonetheless, disengaging drive motor 104 when it is not in use improves efficiency of the system by reducing drag and tire wear. In alternative embodiments of a friction drive system, steps 2313 to 2316 may be skipped altogether and drive motor 104 may remain engaged with tire 202.

In step 2308, the minimum value of the sensor wheel speed may be set to prevent engaging the drive motor below certain vehicle speeds. For example, the minimum value may be set to prevent powering the vehicle below a minimum vehicle speed of 5 mph. Limiting the speed at which the friction drive system provides power may permit compliance with various government regulations related to e-bicycles (and other powered vehicles) and extend vehicle range by preventing operation at low speeds which rapidly drain battery power. The use of speed wheel assembly 300 may also improve safety, because it can be used to prevent operation of the friction drive system then it is not mounted correctly onto a vehicle and the speed wheel is not spinning.

Advantageously, the method of FIG. 12 does not permit simultaneous braking and acceleration, which enhances safety of operation. If the braking signal is above the minimum value of step 2301, then braking will always take priority, even if the throttle signal is also above a minimum.

In step 2311 of FIG. 12, control unit 101 (or ATCS 150) may use a level of throttle input provided with input/output signal 110 to lookup (or calculate) a desired drive motor power, current, torque, or RPM. For example, in some embodiments, a throttle input level may be proportionate to a desired drive motor RPM value; and a maximum throttle input level may correspond to a maximum RPM of drive motor 104. The desired motor RPM value may be compared against the actual RPMs of drive motor 104 (as absolute values or percentages), where the actual drive motor RPM is determined from information in feedback signal 112. If the desired drive motor RPM value is greater than the actual RPM of drive motor 104 by a predetermined amount, then additional power may be provided to drive motor 104, thereby increasing the actual RPM. On the other hand, if the desired drive motor RPM value is less than the actual RPM of drive motor 104 by a predetermined amount, then power to drive motor 104 may be reduced, thereby decreasing the actual RPMs. Moreover, hysteresis may be built into step 2311, such that some amount of variation is tolerated between the desired RPM value and the actual RPM value, before changing the power to drive motor 104. In the alternative, rather than setting a desired drive motor RPM, step 2311 may set a desired drive motor power (or torque or current) and adjust the actual power (or torque or current) to drive motor 104 to match.

Similar to step 2311, step 2304 of FIG. 12 may use a level of brake input provided with input/output signal 110 to lookup (or calculate) a desired drive motor braking power, torque, or RPM. However, rather than providing power ire 202, when braking, drive motor 104 would oppose the motion of tire 202, thereby generating power that could be used to regeneratively charge battery 102. Alternatively, in other embodiments, braking power may be determined as a scaled value (e.g., a percentage of maximum braking power) based on the strength of the brake input signal relative to its maximum.

FIG. 13 shows a method for engagement of a drive motor in embodiments of a friction drive system. In step 2401, control unit 101 receives a request to engage drive motor 104, for example, in steps 2303 or 2310 of FIG. 12. In step 2402, worm gear 142 is advanced by applying forward power to worm gear motor 145, thereby moving contact surface 109 towards tire 202. (when the system is mounted, as shown in FIGS. 8A and 8B). In step 2403, control unit 101 checks if the speed of speed (or "sensor") wheel 301 is greater than zero, indicating that the vehicle is in motion. If no (speed not greater than zero), then in step 2404 control unit 101 determines if a "first torque engagement" position for worm gear motor 145 (and/or worm gear 142) has been defined, where the "first torque engagement" position represents a position where contact surface 109 has come into contact with tire 202 in the embodiment of FIGS. 8A and 8B. If no (not defined), then control unit 101 checks if the current draw of worm gear motor 145 is above a threshold (for example, indicating that contact surface 109 has come into contact with tire 202). If yes (above threshold), then the position of worm gear motor 145 is recorded as the position of "first torque engagement." Then, in step 2407, control unit 101 checks if a "non-slip engagement" position has been defined, where the "non-slip engagement" position represents a position of worm gear motor 145 (and/or worm gear 142) where there is no slippage between contact surface 109 and tire 202 in the embodiment of FIGS. 8A and 8B. If no ("non-slip engagement" not defined), then in step 2408 control unit 101 sets the position of "non-slip engagement" equal to the position of "first torque engagement." For example, the position of "non-slip engagement" may be undefined the first e drive motor 104 is engaged after power-on. Next, in step 2409, the position of worm gear motor 145 is checked to determine if it has reached the position of "non-slip engagement," for example, by reading worm gear position encoder 147. If yes (at "non-slip engagement"), then in step 2415 the state of the system is set to indicate that drive motor 104 is engaged; flow may then return to FIG. 12. Of course, if the position of "non-slip engagement" was just set in step 2408, then step 2409 will return yes. If no (not at "non-slip engagement"), then the method returns to step 2402 and repeats, starting with advancing worm gear 142.

Returning to step 2404, if yes ("first torque engagement" defined), then the method proceeds to step 2409 and checks the position of worm gear motor 145 (and/or worm gear 142), as described above. Similarly, in step 2405, if no (worm gear motor current not above threshold), then the method proceeds to step 2409. And, in step 2407, if yes (position of "non-slip engagement" defined), then the method also proceeds to step 2409.

Returning to step 2403 of FIG. 13, if yes (speed wheel speed greater than zero), an indication that the vehicle is in motion, then in step 2410 control unit 101 checks if a position of "first speed engagement" has been defined. If no (not defined), then in step 2411 control unit 101 checks if the speed of drive motor 104 while unpowered is above a threshold value; when engaged with tire 202, the unpowered (tangential) speed of drive motor 104 should match that of speed wheel 301. If yes (unpowered drive motor speed above threshold), then in step 2412 control unit 101 records the position of worm gear motor 145 (and/or worm gear 142) as a position of "first speed engagement." Next, in step 2413, control unit 101 checks if a position of "non-slip engagement" has been defined. If no (undefined), then in step 2414 the position of "non-slip engagement" is set to the position of "first speed engagement." Next, in step 2409, the position of worm gear motor 145 is checked to determine if it has reached the position of "non-slip engagement," and the method proceeds as already described above.

In embodiments of a friction drive system, in step 2403, if the speed of speed wheel 301 is greater than zero, then the speed of drive motor 104 may be set such that the tangential speed of contact surface 109 is about equal to the tangential speed of sensor wheel 301; when engaged, the tangential speed of speed wheel 301 equals the tangential speed of tire 202 and vehicle 200. Thus, by setting the speed of the contact surface 109 about equal to the speed of tire 202, contact surface 109 may be engaged smoothly with tire 202 without any abrupt changes to vehicle speed. In particular, this speed matching step may be advantageous in embodiments where drive motor 104 has a strong internal resistance when externally driven (e.g., by contact with tire 202).

Returning to step 2410, if yes ("first speed engagement" defined), then the method proceeds to step 2409 and checks the position of worm gear motor 145 (and/or worm gear 142), as described above. Similarly, in step 2411, if no (unpowered drive motor speed not above threshold), then the method proceeds to step 2409. And, in step 2412, if yes (position of "non-slip engagement" defined), then the method also proceeds to step 2409.

The method of FIG. 13 includes two branches, depending on whether or not the vehicle is moving, as indicated by the speed of the speed wheel in step 2403. The worm gear motor current signal, measured in step 2405, tends to be noisy, whereas the drive motor spins up to speed consistently after making contact with the tire in step 2411. As a result, the position of "first speed engagement", set when the vehicle is moving, generally is more accurate than the position of "first torque engagement", set when the vehicle is not moving. Nonetheless, both branches are included, because the drive motor may be engaged with the tire when the vehicle is stationary, in some embodiments.

The first time the drive motor engagement method of FIG. 13 is run after power-on, the system will set either a position of "first torque engagement" or a position of "first speed engagement" and an initial position of "non-slip engagement," depending on whether the vehicle is moving (as indicated by the speed wheel in step 2403). The position of "non-slip engagement" may then be updated when the method for auto-slip detect is run, as described with respect to FIG. 14 below. Advantageously, this allows the system to recalibrate each time it is activated, which is important when the friction drive system is mounted on a different vehicle or when a significant amount of time has passed (for example, causing the tire pressure to change).

FIG. 14 shows a method for providing automatic auto-slip detection in embodiments of a friction drive system which may be performed by ATCS 150 of control unit 101. In step 2500 the slippage detect loop in initiated, for example, in response to a command from control unit 101 in steps 2305 or 2312 of FIG. 12. In step 2501, control unit 101 measures the speed of drive motor 104, for example, using information provided in feedback signal 112 (and/or from BLDC 106). In step 2502, control unit 101 measures a speed of speed wheel 301 and compares a ratio of the drive motor speed to the speed wheel speed against a threshold value. For example, a speed of speed wheel 301 may be determined from information provided by a speed wheel encoder assembly (including encoder magnet 315 and encoder PCB 316), as shown in FIG. 1C.

In step 2502 of FIG. 14, the comparison of drive motor speed to sensor wheel speed provides an indication of whether slippage is occurring. In particular, when there is no slippage and drive motor 104 is engaged with the tire, then the tangential speeds of speed wheel 301 and contact surface 109 of drive motor 104 should be equal—and the ratios of the angular speeds (or RPMs) will be a known value—a constant no-slip ratio—determined by the relative diameters of the wheels. Thus, when the ratio of angular speeds changes by a certain amount from the no-slip ratio, it can be determined that there is slippage between tire 202 and contact surface 109. In particular, if the ratio is not below the threshold when braking or not above the threshold when in throttle mode, then slippage is likely not occurring. Conversely, if the ratio is below the threshold when braking or above the threshold when in throttle mode, then slippage likely is occurring. Moreover, in some embodiments of a friction drive system, different threshold values may be used for brake mode and throttle mode in step 2502.

If no slippage is detected in step 2502, then in step 2503 power is restored to drive motor 104 to match the target power (or braking) determined from the throttle (or brake) input signal, if power was reduced in the previous iteration of the loop (specifically, in step 2512); if power was not reduced in the previous iteration, then there is no change to power to drive motor 104 in step 2503. Next, in step 2504, a "no slip counter" variable is incremented by 1. Then in step 2505 control unit 101 checks if the "no slip counter" is above a minimum delay threshold. If no (below minimum delay threshold), in step 2506, control unit 101 checks if an optimize button has been pressed; for example, an optimize button may be provided on the throttle for activation by a user, when the user desires to optimize the amount of normal force after a change in road conditions (for example, if the road has dried after a rain storm). If no (optimize button not pressed), then control unit 101 returns to the throttle/brake read method (e.g., of FIG. 12) in step 2507. If yes (optimize button pressed), then in step 2508 control unit 101 incrementally retracts worm gear 142 by applying reverse power to worm gear motor 145. Retracting worm gear 142 acts to reduce the normal force by moving contact surface 109 away from tire 202. Next, in step 2509, the position of worm gear motor 145 is recorded in memory as the position of "non-slip engagement." If the position of non-slip engagement was previously set, for example, in step 2408 or 2414 of FIG. 13, then it will be overwritten with the new value. Next, in step 2510, the no-slip counter is reset. In step 2511, control unit 101 then returns to the throttle/brake read method (e.g., of FIG. 12). Notably, the use of a "no-slip counter" in steps 2504 and 2505 provides a delay before retracting the worm gear in step 2508, thereby preventing rapid changes to the normal force and improving consistency of operation.

Returning to step 2502 of FIG. 14, if the comparison indicates that slippage exists, then in step 2512 control unit 101 reduces (or cuts completely) power to drive motor 104. Because drive motor 104 remains engaged with tire 202 when power is reduced, the speed of drive motor 104 can quickly be adjusted to match that of tire 202. Alternatively, control unit 101 may send a command to set the speed of drive motor 104 such that the tangential speed of contact surface 109 equals the tangential speed of speed wheel 301 (and tire 202); in this case, drive motor 104 remains powered but its speed is adjusted to match tire 202. Next in step 2513, worm gear 142 is advanced by applying forward power to worm gear motor 145. For example, in the embodiment of FIGS. 8A and 8B, control unit 101 may send a command to power worm gear motor 145, such that worm gear 142 advances and drive assembly 103 moves an incremental amount towards tire 202, thereby increasing the normal force between contact surface 109 and tire 202. Next, in step 2514, control unit 101 records in memory the position of worm gear motor 145 (e.g., as determined from worm gear position encoder 147) as the position of "non-slip engagement"; if the position of "non-slip engagement" was previously stored, it will be overwritten. In step 2515, the no-slip counter is reset, and in step 2516 control unit 101 returns to the throttle/brake read method (e.g., of FIG. 12).

By selectively increasing or decreasing the amount of normal force applied by the friction drive using the method of FIG. 14, ATCS 150 and control unit 101 are able to prevent unnecessary tire wear and improve system efficiency, including improved vehicle range and battery life. Furthermore, the method of FIG. 14 allows the friction drive system to quickly achieve and maintain an optimal amount of normal force that maximizes system efficiency while also preventing potentially dangerous slippage that can cause sudden changes in vehicle speed.

In embodiments of a friction drive system, ATCS 150 may continuously vary the normal force for optimal system performance, maintaining sufficient friction between contact surface 109 and tire 102 to prevent slippage, while also improving battery efficiency and reducing wear on tire 202. For example, ATCS 150 may quickly increase the normal force when slippage is detected, until traction is regained between contact surface 109 and tire 202. As another example, ATCS 150 may quickly reduce the normal force to maximize battery efficiency. And, in some embodiments, ATCS 150 may completely disengage contact surface 109 from tire 102 when drive motor 104 is not providing power to eliminate drag.

In embodiments of a friction drive system, ATCS 150 may detect slippage in a number of ways. For example, slippage may be detected by comparing the tangential speed of tire 202 (as measured by speed wheel assembly 300) to the tangential speed of contact surface 109 (as measured by a drive motor encoder). If the surface of tire 202 is moving at a different speed than contact surface 109 while the state of the system indicates that the two are in contact, then ATCS 150 may determine that slippage exists. In some embodiments, the speed of tire 202 may be calculated from the rotational speed (or RPMs) of wheel 201; and the speed of contact surface 109 may be calculated from the rotational speed (or RPMs) of drive motor 104. Similarly, angular speeds may be compared to detect slippage using known physical relationships. For example, tangential speed is related to rotational speed by the relationship:

$$V_t = \omega * r$$

where $V_t$ is the tangential velocity, $\omega$ is angular velocity, and $r$ is the radius of the circular body.

In alternative embodiments of a friction drive system, ATCS 150 may use current drawn by worm gear motor 145 as an indicator of how much normal force exists between contact surface 109 and tire 202; as the normal force increases, so does the current drawn by worm gear motor 145. Taking into account the direction in which worm gear 142 is moved (e.g., in the forward direction), it may be determined when contact is made with tire 202, because motor current will increase rapidly upon contact. When contact surface 109 is disengaged from tire 202 (and other surfaces), worm gear motor 145 draws very little current. Once contact surface 109 engages with tire 202, current drawn by gear motor 145 rapidly increases. Current drawn by worm gear 145 may be proportional (or have another known relationship) to the amount of normal force between contact surface 109 and tire 202. Thus, the amount of normal force may be controlled by regulating the current drawn by gear motor 145. Advantageously, slippage may be prevented regardless of the exact placement of friction drive system 100 relative to tire 202 and regardless of the amount of air pressure in tire 202, because worm gear 142 may continue advancing until the normal force reaches a value sufficient to prevent slippage while minimizing tear wear.

In embodiments of a friction drive system, a threshold level of current drawn by gear motor 145 may be predetermined and/or preset to provide an optimal amount of normal force (and, thus, friction) under normal operating conditions (e.g., dry conditions on a paved road). In other embodiments, the threshold level may be set dynamically based on detected conditions, such as moisture on tire 202, motor RPMs, battery state, and/or other parameters. In still other embodiments, the threshold level may be determined, at least in part, based on a mode selected by the user (e.g., "High Traction", "Low Traction", "Wet Road". In yet other embodiments, the threshold level may be set during the initialization process, for example, a certain amount between the minimum and maximum recorded values. It also may be possible to command worm gear 142 to a predetermined position (or a position set during initialization) without (or in addition to) monitoring current drawn by gear motor 145.

Embodiments of friction drive system 100 described herein may use regenerative charging and/or braking to restore power to battery unit 102 when wheeled vehicle 200 brakes. For example, by leaving contact surface 109 engaged with tire 202 during braking, it a reverse current generated in drive motor 104 may be used to power rechargeable batteries in battery unit 102. In addition, because the system may control normal force independently from drive motor direction and torque, regenerative braking may be used by simultaneously reversing direction of drive motor 104 while also increasing normal force, thereby applying high braking force to the wheel while regeneratively charging battery unit 102. Such a regenerative braking system also may offer the safety benefit of a secondary braking system for the bicycle or scooter (or other wheeled vehicle) which friction drive system 100 is mounted on.

Embodiments of friction drive system 100 may include electrical components for charging the battery, for powering lights, for charging external devices, and for other purposes. These electrical components may be provided within control unit 101, battery unit 102, drive assembly 103, case 120, and/or separately. For example, drive assembly 103 may include lights powered by battery unit 102. As another example, battery unit 102 may include one or more USB ports for powering (or charging) external devices (e.g., cell phones, lights, cameras, etc.) using power from battery unit 102. As yet another example, battery unit 102 may a include plug (and associated circuitry) for connecting with a standard electrical outlet to charge battery unit 102. Thus, friction drive system 100 (and/or battery unit 102) may be used as a portable power supply capable of powering various electrical devices, both on and off a wheeled vehicle.

Embodiments of friction drive system 100 also may include software for collecting information and/or performing calculations related to performance, diagnostics, and/or tracking and for outputting related information to a display (e.g., LCD or LED screen) disposed on friction drive system 100; alternatively or in addition, information may be output to an application ("APP") running on an external device, such as a smartphone or computer, for processing and/or display there. For example, software running on a processor within control unit 100 may use information gathered from battery 102, drive assembly 103, and/or wheeled vehicle 200 to perform calculations and output the speed, battery charge, battery efficiency, and/or projected range (among other things) for display. A projected range may be continuously updated in near real-time as friction drive system 100 is used, based on information such as battery charge, distance traveled, vehicle speed, and/or motor speed.

In embodiments of a friction drive system, software running on a processor within control unit 100 (or elsewhere) also may control the mode and/or settings of friction drive system 100 in response to a user input. For example, a user may operate a user interface (e.g., by pressing buttons) to select a traction mode, to set maximum power and/or speed limits, to set when the motor should begin delivering power, and/or to adjust other settings. For example, a user may select to power motor 104 only when a certain threshold of vehicle (or pedal) speed is exceeded. In some embodiments, a user may select the traction mode—such as "dry" or "wet"—directly via the APP. As already explained, the APP also may display information such as distance, location, battery power, battery efficiency, projected range, and so forth. The APP may also store information and display information over time and/or historical performance metrics.

In view of the present disclosure, a person of skill in the art would understand that other mechanisms may be used to control the amount of depression into the tire and, thus, the amount of normal force. For example, rather than a pivoting mechanism powered by worm gear motor 145, other embodiments of a friction drive system could employ a linear motion mechanism that would enable motor mount assembly 140 to move closer into tire 202 to increase normal force or away from tire 202 to decrease normal force. Such a linear motion mechanism could be controlled and adjusted manually by the user or automatically by control unit 101 through a linear actuator (or similar).

In view of the present disclosure, a person of skill in the art would understand that embodiments described as engaging with a tire could be modified to engage with other parts of the wheel, such as the rim. A person of skill in the art would also understand that embodiments in which a contact surface on the motor engages directly with the tire may be modified such that a contact surface on one or more rollers—powered by the motor—engages with the tire or wheel; in this case, the motor may be enclosed within the casing. A person of skill in the art would also understand that embodiments described with respect to bicycles may be modified to work on other wheeled vehicles, such as scooters, skateboards, wheelchairs, and the like.

Advantages of embodiments of friction drive systems disclosed herein include, without limitation, the ability to add or remove electric friction drive power to a standard non-electric bike or scooter in seconds, the ability to use electric friction drive on multiple bikes and/or scooters interchangeably (including with folding bikes and kick scooters), and the ability to carry spare electric friction drive power in a briefcase or bag to be used whenever it is needed. In addition, embodiments of a friction drive system disclosed herein are portable and can easily be taken with the user to prevent theft of valuable e-bike components.

Other advantages of friction drive systems and control algorithms disclosed herein include the ability to automatically adjust the amount of friction delivered in order to prevent slippage and adjust for changing conditions, which also may increase battery life and decrease tire wear. Other advantages disclosed herein include safer operation of a friction drive system. For example, by turning off power to the drive motor when slippage is detected, embodiments disclosed herein may prevent the tire from suddenly reengaging (or catching) with the contact surface. Other advantages disclosed herein include automatic and rapid engagement and disengagement of the contact surface with the tire on-demand.

Embodiments of friction drive systems disclosed herein may be used with bike share bicycles and, advantageously, may provide electric power to a bike share bicycle without requiring the expense or complexity of conventional electric bicycles, which typically require battery swap functionality and multi-battery docking stations for bike share use. Additionally, embodiments disclosed herein allow individuals to add electric power to a bike share bicycle when it would otherwise not be available. This allows individuals to experience the benefits of electric bicycles including reduced effort, faster speed, and longer range, while taking advantage of the benefits of a bike share program. Embodiments disclosed herein also allow bike share operators to benefit from increased membership due to the attractiveness of electric power to individuals, and higher asset utilization of their bike share fleet, as the higher speeds enabled by electric power shorten the time needed for an individual to complete a trip and allow the bike to be returned to the dock and checked out by another user more quickly.

As would be understood by a person of skill in the art in view of the present disclosure, the physical relationships between electrical current, voltage, and power are well-known and these values can be calculated from one another, given other known parameters of the system (e.g., electrical resistance). In addition, for any given motor, motor torque may be calculated from motor current. Thus, the methods described herein may be modified to make control decisions based on one or more of electrical current, power, voltage, and/or motor torque addition to other parameters) within the scope of the invention(s).

It should be understood that, while various embodiments have been described herein, the claimed invention(s) should not be limited by those embodiments. To the contrary, the foregoing summary, detailed description, figures, and abstract have been presented for illustrative purposes, and are not meant to limit the claims. Indeed, as a person of skill in the art in view of the present disclosure would recognize, various changes can be made to the embodiments described herein without departing from the scope and spirit of the present invention(s).

The invention claimed is:

1. A friction drive system, comprising:
a control unit comprising a computer processor and a memory;
a drive assembly comprising a drive motor, a speed wheel, and a pivot mechanism comprising a worm gear coupled to a pivot bracket; and
a battery that provides power to the drive motor in response to commands from the control unit,
wherein the control unit controls a position of the worm gear relative to the pivot bracket by sending commands to a worm gear motor that powers the worm gear, and the commands determine an amount of power provided to the worm gear motor, and
wherein the amount of power provided to the worm gear motor is determined, at least in part, by information in a feedback signal from the drive assembly to the control unit, and the information in the feedback signal comprises an angular speed of the speed wheel and an angular speed of the drive motor.

2. The friction drive system of claim 1,
wherein the position of the worm gear relative to the pivot bracket determines an amount of normal force applied by a contact surface disposed on the drive motor.

3. The friction drive system of claim 1,
wherein the control unit determines whether to provide power to the worm gear motor by comparing a ratio of the angular speed of the drive motor to the angular speed of the speed wheel with a threshold value.

4. The friction drive system of claim 3,
wherein the worm gear motor adjusts the position of the worm gear relative to the pivot bracket if the ratio differs from the threshold value by a predetermined amount.

5. A method of controlling a friction drive system comprising a control unit, a drive motor, an adjustment mechanism coupled to the drive motor, a speed wheel, and a battery, the method comprising the steps of:
providing power from the battery to the drive motor in response to commands from the control unit;
determining an amount of power to provide to the adjustment mechanism, at least in part, from information in a feedback signal to the control unit, wherein the information in the feedback signal comprises an angular speed of the speed wheel and an angular speed of the drive motor; and
adjusting a position of the drive motor relative to a mounting point by providing the determined amount of power to the adjustment mechanism.

6. A method of controlling a friction drive system comprising a control unit, a drive motor, a worm gear coupled to a pivot bracket, a worm gear motor that powers the worm gear, and a battery, the method comprising the steps of:
providing power from the battery to the drive motor in response to commands from the control unit;
controlling a position of the worm gear relative to the pivot bracket by sending commands from the control unit to the worm gear motor; and
determining an amount of power to provide to the worm gear motor, at least in part, from information in a feedback signal to the control unit,
wherein the information in the feedback signal comprises an angular speed of a speed wheel and an angular speed of the drive motor.

7. The method of claim 6,
wherein the position of the worm gear relative to the pivot bracket determines an amount of normal force applied by a contact surface disposed on the drive motor.

8. The method of claim 6, further comprising:
determining whether to provide power to the worm gear motor by comparing a ratio of the angular speed of the drive motor to the angular speed of the speed wheel with a threshold value.

\* \* \* \* \*